United States Patent
Cohen et al.

(10) Patent No.: US 10,025,735 B2
(45) Date of Patent: Jul. 17, 2018

(54) DECOUPLED LOCKING DMA ARCHITECTURE

(71) Applicant: Seagate Technology LLC, Cupertino, CA (US)

(72) Inventors: Earl T Cohen, Oakland, CA (US); Timothy Lawrence Canepa, Los Gatos, CA (US)

(73) Assignee: Seagate Technology LLC, Cupertino, CA (US)

(*) Notice: Subject to any disclaimer, the term of this patent is extended or adjusted under 35 U.S.C. 154(b) by 346 days.

(21) Appl. No.: 14/161,290

(22) Filed: Jan. 22, 2014

(65) Prior Publication Data

US 2014/0215103 A1 Jul. 31, 2014

Related U.S. Application Data

(60) Provisional application No. 61/758,770, filed on Jan. 31, 2013.

(51) Int. Cl.
*G06F 13/28* (2006.01)

(52) U.S. Cl.
CPC .................................. *G06F 13/28* (2013.01)

(58) Field of Classification Search
None
See application file for complete search history.

(56) References Cited

U.S. PATENT DOCUMENTS

| 2001/0053148 A1* | 12/2001 | Bilic et al. ..................... 370/389 |
| 2010/0058155 A1* | 3/2010 | Wu ............................... 714/807 |
| 2011/0258457 A1* | 10/2011 | Noehring ............ H04L 63/0428 713/189 |
| 2012/0079352 A1* | 3/2012 | Frost et al. .................. 714/767 |

* cited by examiner

*Primary Examiner* — Henry Tsai
*Assistant Examiner* — Dean Phan
(74) *Attorney, Agent, or Firm* — Cesari & Reed, LLP; Kirk A. Cesari; Logan Brown

(57) ABSTRACT

A decoupled Direct Memory Access (DMA) architecture includes at least two DMA controllers, and optionally at least one of the DMA controllers is operable to assert a lock signal operable to selectively inhibit write access to at least a portion of one system data storage element. The DMA controllers are optionally operable to communicate pending task information and to reschedule pending tasks of at least one the DMA controllers. Optionally data is transferred from at least a first one of the DMA controllers to one or more function units, and processed data from the function units is provided to at least a second one of the DMA controllers. Optionally the DMA controllers and one or more memory elements accessible to the DMA controllers are implemented as part of an I/O device.

20 Claims, 12 Drawing Sheets

DECOUPLED LOCKING DMA ARCHITECTURE

CROSS REFERENCE TO RELATED APPLICATIONS

Priority benefit claims for this application are made in the accompanying Application Data Sheet, Request, or Transmittal (as appropriate, if any). To the extent permitted by the type of the instant application, this application incorporates by reference for all purposes the following applications, all commonly owned with the instant application at the time the invention was made:

U.S. Provisional Application (Ser. No. 61/758,770), filed 31 Jan. 2013, first named inventor Earl T. COHEN, and entitled DECOUPLED LOCKING DMA ARCHITECTURE.

BACKGROUND

Field

Advancements in direct memory access and memory locking technology are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Synopsis

The invention may be implemented in numerous ways, e.g. as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

LIST OF REFERENCE SYMBOLS IN DRAWINGS

Figure 1A:
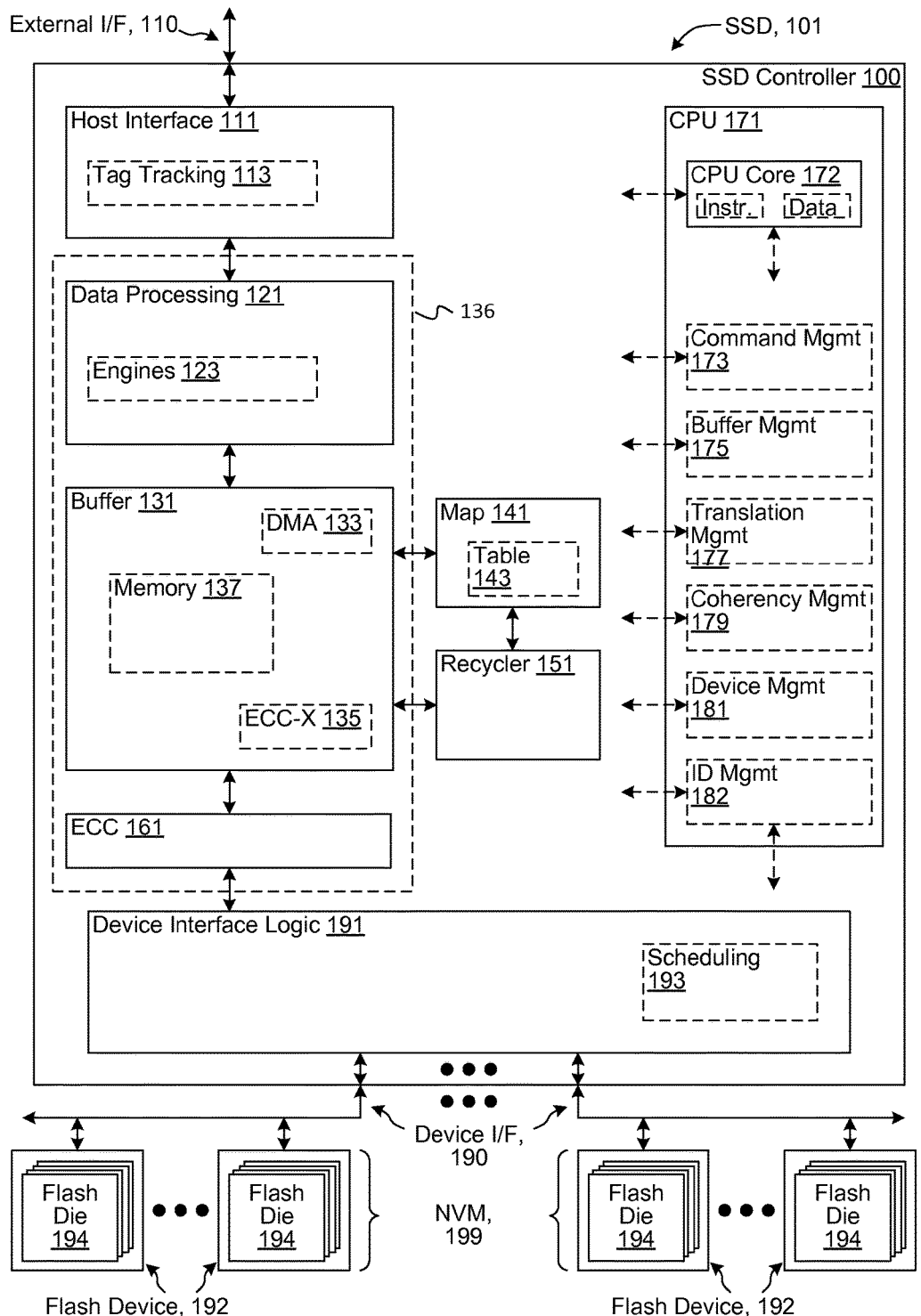
FIG. 1A illustrates selected details of an embodiment of a Solid-State Disk (SSD) including an SSD controller employing a decoupled locking Direct Memory Access (DMA) architecture.

| Ref. Symbol | Element Name |
| --- | --- |
| 100 | SSD Controller |
| 101 | SSD |
| 102 | Host |
| 103 | (optional) Switch/Fabric/Intermediate Controller |
| 104 | Intermediate Interfaces |
| 105 | OS |
| 106 | FirmWare (FW) |
| 107 | Driver |
| 107D | dotted-arrow (Host Software ←→ I/O Device Communication) |
| 109 | Application |
| 109D | dotted-arrow (Application ←→ I/O Device Communication via driver) |
| 109V | dotted-arrow (Application ←→ I/O Device Communication via VF) |
| 110 | External Interfaces |
| 111 | Host Interfaces |
| 112C | (optional) Card Memory |
| 113 | Tag Tracking |
| 114 | Multi-Device Management Software |
| 115 | Host Software |
| 116 | I/O Card |
| 117 | I/O & Storage Devices/Resources |
| 118 | Servers |
| 119 | LAN/WAN |
| 121 | Data Processing |
| 123 | Engines |
| 131 | Buffer |
| 133 | DMA |
| 135 | ECC-X |
| 136 | Superblock |
| 137 | Memory |
| 141 | Map |
| 143 | Table |
| 151 | Recycler |
| 161 | ECC |
| 171 | CPU |
| 172 | CPU Core |
| 173 | Command Management |
| 175 | Buffer Management |
| 177 | Translation Management |
| 179 | Coherency Management |
| 180 | Memory Interface |

-continued

| Ref. Symbol | Element Name |
|---|---|
| 181 | Device Management |
| 182 | Identity Management |
| 190 | Device Interfaces |
| 191 | Device Interface Logic |
| 192 | Flash Device |
| 193 | Scheduling |
| 194 | Flash Die |
| 199 | NVM |
| 700 | DMA arrangement |
| 710 | First DMA (a.k.a. DMA-1) |
| 720 | Second DMA (a.k.a. DMA-2) |
| 730 | Function Unit |
| 735 | First bus |
| 736 | Locking sub-bus of Bus 740, comprising -A, -L, and -M components |
| 736-A | ACK (one per function unit, according to embodiment) |
| 736-L | Lock |
| 736-M | Mine signal (one per function unit, according to embodiment) |
| 737, 738 | Buses coupling function unit 730 and Interconnect 810 (811), in FIG. 3A (3B) |
| 739 | Address/Data sub-bus of Bus 740 |
| 740, 741 | Address/Data/Locking Buses respectively for Buffer 755, 765 |
| 744, 745 | Buses coupling function unit 730 to second DMA, in FIG. 2 |
| 755, 765 | buffers |
| 770, 780 | CPUs |
| 800, 801 | Instances of a second DMA arrangement |
| 810, 811 | Interconnect instances |
| 900 | DMA controller |
| 910 | Command unit |
| 920 | Control unit |
| 930 | Locking unit |
| 950 | Indexed command store |
| 1010 | Function logic |
| 1020 | Lock control |
| 1030 (a), (b), (c), (d) | Ports |
| 1040 | Lock Input to Lock control 1020 |
| 1045 | Mine Output of Lock control 1020 |
| 1050 | Lock acknowledge (ACK) Output of Lock control 1020 |
| 1100 | Frame format |
| 1110 | Header |
| 1120 | ID |
| 1130 | Length |
| 1140 | Channel ID |
| 1150 | DPCI |
| 1160 | Command |
| 1210A, 1210B, 1210C | Start |
| 1220A, 1220B, 1220C | Access Command |
| 1230A, 1230B, 1230C | Lock? |
| 1240A, 1240B, 1240C | Assert Lock Signal |
| 1243 | ACK Type? |
| 1246B, 1246C | ACK Received? |
| 1280A, 1280B, 1280C | Continue processing |
| 1300 | Procedure |
| 1310 | Start |
| 1320 | Task Descriptions |
| 1330 | Send to $2^{nd}$ DMA |
| 1340 | Receive Order Information |
| 1350 | Order Tasks |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (including but not limited to: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

Introduction

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

Acronyms

At least some of the various shorthand abbreviations (e.g. acronyms) defined here refer to certain elements used herein.

| Acronym | Description |
|---|---|
| AHCI | Advanced Host Controller Interface |
| API | Application Program Interface |
| ATA | Advanced Technology Attachment (AT Attachment) |
| BCH | Bose Chaudhuri Hocquenghem |
| CD | Compact Disk |
| CF | Compact Flash |
| CMOS | Complementary Metal Oxide Semiconductor |
| CPU | Central Processing Unit |
| CRC | Cyclic Redundancy Check |
| DAS | Direct Attached Storage |
| DDR | Double-Data-Rate |
| DMA | Direct Memory Access |
| DNA | Direct NAND Access |
| DRAM | Dynamic Random Access Memory |
| DVD | Digital Versatile/Video Disk |
| DVR | Digital Video Recorder |
| ECC | Error-Correcting Code |
| eMMC | Embedded MultiMediaCard |
| eSATA | external Serial Advanced Technology Attachment |
| GPS | Global Positioning System |
| HDD | Hard Disk Drive |
| I/O | Input/Output |
| IC | Integrated Circuit |
| IDE | Integrated Drive Electronics |

-continued

| Acronym | Description |
| --- | --- |
| JPEG | Joint Photographic Experts Group |
| LAN | Local Area Network |
| LBA | Logical Block Address |
| LDPC | Low-Density Parity-Check |
| MLC | Multi-Level Cell |
| MMC | MultiMediaCard |
| MPEG | Moving Picture Experts Group |
| NAS | Network Attached Storage |
| NCQ | Native Command Queuing |
| NVM | Non-Volatile Memory |
| ONA | Optimized NAND Access |
| ONFI | Open NAND Flash Interface |
| OS | Operating System |
| PC | Personal Computer |
| PCIe | Peripheral Component Interconnect express (PCI express) |
| PDA | Personal Digital Assistant |
| PHY | PHYsical interface |
| POS | Point Of Sale |
| RAID | Redundant Array of Inexpensive/Independent Disks |
| RASIE | Redundant Array of Silicon Independent Elements |
| RS | Reed-Solomon |
| SAN | Storage Attached Network |
| SAS | Serial Attached Small Computer System Interface (Serial SCSI) |
| SATA | Serial Advanced Technology Attachment (Serial ATA) |
| SCSI | Small Computer System Interface |
| SD | Secure Digital |
| SDR | Single-Data-Rate |
| SLC | Single-Level Cell |
| SMART | Self-Monitoring Analysis and Reporting Technology |
| SRAM | Static Random Access Memory |
| SSD | Solid-State Disk/Drive |
| TDMA | Time Division Multiple Access |
| UFS | Unified Flash Storage |
| USB | Universal Serial Bus |
| VF | Virtual Function |
| WAN | Wide Area Network |

A decoupled DMA architecture includes at least two DMA controllers, and optionally at least one of the DMA controllers is operable to assert a lock signal operable to selectively inhibit write access to at least a portion of one system data storage element. The DMA controllers are optionally operable to communicate pending task information and to reschedule pending tasks of at least one the DMA controllers. Optionally data is transferred from at least a first one of the DMA controllers to one or more function units, and processed data from the function units is provided to at least a second one of the DMA controllers. Optionally the DMA controllers and one or more memory elements accessible to the DMA controllers are implemented as part of an I/O device.

In some embodiments, an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level error correction, higher-level error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as an SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims.

EC1. A system comprising:
- a buffer memory;
- one or more lockable function units enabled to access the buffer memory, the lockable function units coupled to a lock bus, and each of the lockable function units associated with one or more respective access regions of the buffer memory;
- a DMA controller comprising:
- a task manager operable to process a queue of two or more data transfer commands, each of the data transfer commands specifying a respective access region in the buffer memory;
- a lock unit operable to selectively communicate a lock command according to a current one of the data transfer commands to the lockable function units via the lock bus, the lock command comprising the respective access region of the current data transfer command, and the lock unit further operable to receive acknowledgements from the lockable function units via the lock bus;
- a data transfer unit enabled to access the respective access region of the current data transfer command in the buffer memory; and
- wherein subsequent to a particular one of the lockable function units acknowledging the lock command, the particular lockable function unit is disabled from accessing the respective access region of the current data transfer command in the buffer memory if the respective access region of the current data transfer command and one of the respective access regions of the buffer memory of the particular lockable function unit specify a same location of the buffer memory.

EC2. The system of EC1, wherein subsequent to completion of the access of the respective buffer location region of the current data transfer command in the buffer memory by the data transfer unit, the lock unit is enabled to selectively communicate an unlock command via the lock bus.

EC3. The system of EC2, wherein subsequent to receiving the unlock command, the particular lockable function unit is enabled to access the respective buffer location region of the current data transfer command in the buffer memory.

EC4. The system of EC1, wherein the data transfer unit is not enabled to access the respective access region of the current data transfer command in the buffer memory prior to the lock unit receiving the acknowledgements from the lockable function units via the lock bus.

EC5. The system of EC1, wherein subsequent to a second one of the lockable function units other than the particular lockable function unit acknowledging the lock command, the second lockable function unit is enabled to access any of the respective access regions of the buffer memory of the second lockable function unit if the respective access region of the current data transfer command does not specify a same location of the buffer memory as any of the respective access regions of the buffer memory of the second lockable function unit.

EC6. The system of EC1, wherein each of the lockable function units comprises function logic selectively performing at least one of general purpose processing, application-specific processing, pass-through, data compression, cryptography, error correcting coding, error detecting coding, checkpoint data generation, a predetermined mathematical manipulation, and a predetermined logical manipulation.

EC7. A method comprising:
- asserting, by a first memory-access agent of a plurality of memory-access agents sharing read/write access to a memory, a request for a suspension of writes to a specified portion of the memory distinct from other portions of the memory;
- reading the specified subset of the memory by the first memory-access agent, subsequent to a confirmation that the suspension of writes is in force; and
- writing to at least part of the other portions of the memory, by one or more of the plurality of memory-access agents, concurrently with the suspension of writes to the specified portion of the memory.

EC8. The method of EC7, wherein the specified portion of the memory is no more than a 1/N fraction of the memory, writes to the specified portion of the memory by the plurality of memory-access agents are delayed by the suspension of writes at most for an interval of time corresponding to the reading of the 1/N fraction of the memory, read/write access to the other portions of the memory are not delayed by the suspension of writes, and N is in accordance with a desired latency, a size of the memory, and a rate of the reading.

EC9. The method of EC7, further comprising delaying the reading until subsequent to the confirmation.

EC10. The method of EC7, wherein the suspension of writes is in force for less than one-thirty-second (1/32) of the memory at a time.

EC11. The method of EC7, wherein the suspension of writes is in force for at least 32 KB of the memory.

EC12. The method of EC7, wherein the suspension of writes is in force for no more than one-sixty-fourth (1/64) of the memory at a time.

EC13. The method of EC12, wherein activities performed by the plurality of memory-access agents are delayed by the suspension of writes at most for an interval of time corresponding to the reading of the one-sixty-fourth (1/64) of the memory.

EC14. The method of EC7, further comprising: deasserting the request by the first memory-access agent, subsequent to completion of the reading.

EC15. The method of EC14, wherein the asserting and the deasserting are via a lock bus.

EC16. The method of EC7, wherein the asserting and the confirmation implement a lock handshake, the reading is a locked fetch, the request is a lock request comprising a lock command and at least an address and a length of a lock region comprising the specified portion of the memory, the first memory-access agent is a DMA controller, and the plurality of memory-access agents otherwise comprise at least one memory-access agent that is a lockable function unit.

EC17. The method of EC16, wherein the lockable function unit comprises function logic selectively performing at least one of general purpose processing, application-specific processing, pass-through, data compression, cryptography, error correcting coding, error detecting coding, checkpoint data generation, a predetermined mathematical manipulation, and a predetermined logical manipulation.

EC18. The method of EC7, wherein the first memory-access agent is a DMA controller.

EC19. The method of EC18, wherein the specified portion of the memory is a first portion of the memory and the DMA controller comprises a conventional DMA controller enabled to execute commands to perform transfers between the first portion of the memory and a second portion of the other portions of the memory.

EC20. The method of EC18, wherein the DMA controller comprises a single-ended DMA controller in a first sub-system and the single-ended DMA controller is enabled to execute commands to perform transfers between the specified portion of the memory and one or more DMA channels communicating with at least a second sub-system.

EC21. The method of EC7, wherein the first memory-access agent is a DMA controller enabled to process a scatter-gather list (SGL) comprising a plurality of entries corresponding respectively to a plurality of non-contiguous portions of the memory to be transferred, wherein each of the entries is enabled to selectively specify a lock request for the corresponding respective portion of the memory, and the request for the suspension of writes to the specified portion of the memory is an instance of the lock request for an instance of one of the entries in the SGL.

EC22. The method of EC7, wherein the memory is a buffer memory, the first memory-access agent comprises a DMA controller, and the plurality of memory-access agents otherwise comprise at least one memory-access agent that maintains a data structure in the memory.

EC23. The method of EC22, further comprising.
checkpointing at least a portion of the data structure; and
wherein the checkpointing comprises the reading.

EC24. The method of EC8, wherein the memory is a buffer memory, the first memory-access agent is a DMA controller, the plurality of memory-access agents otherwise comprise a second memory-access agent that periodically updates an associated first data structure stored at least in part in the specified portion of the memory and a third memory-access agent that periodically updates an associated second data structure corresponding to the part of the other portions of the memory, and the third memory-access agent is enabled to perform the writing to the part of the other portions of the memory during the suspension of writes to the specified portion of the memory.

EC25. The method of EC24, further comprising.
checkpointing at least a portion of the first data structure; and
wherein the checkpointing comprises the reading.

EC26. The method of EC24, wherein the buffer memory and the memory-access agents are comprised in a solid-state drive (SSD), and the first data structure and the second data structure comprise SSD operational information selectively written to flash memory of the SSD at least in part via the DMA controller.

EC27. The method of EC26, wherein the selective writing of the SSD operational information is comprised in a checkpoint written to the flash memory and enabling restoration of normal operation of the SSD subsequent to an event that disturbs the normal operation.

EC28. The method of EC27, wherein the SSD operational information written comprised in the checkpoint comprises at least one of statistics, configuration, and state.

EC29. The method of EC27, wherein the update of each data structure is at times delayed by the reading by the DMA controller in proportion to the size of each data structure, the update of each data structure is not delayed by the DMA controller reading the other data structures, and a total time required to update the SSD operational information comprised in the checkpoint is reduced compared to suspending writes at a larger granularity than the specified portion of the memory.

EC30. The method of EC7, wherein the asserting is in response to a non-deterministic triggering event.

EC31. The method of EC30, wherein the memory-access agents and the memory are in a first sub-system and the triggering event originates from a second sub-system.

EC32. The method of EC31, wherein the first sub-system and the second sub-system are in different partitions of a same integrated circuit.

EC33. The method of EC31, wherein the first sub-system and the second sub-system are implemented in different intellectual property (IP) blocks.

EC34. The method of EC31, wherein the first sub-system and the second sub-system are in different integrated circuits.

EC35. The method of EC20, wherein the memory-access agents and the memory are in a first sub-system and the asserting is in response to a non-deterministic DMA fetch request originating from a second sub-system.

EC36. A device comprising:
means for asserting, by a first memory-access agent of a plurality of memory-access agents sharing read/write access to a memory, a request for a suspension of writes to a specified portion of the memory distinct from other portions of the memory;
means for reading the specified subset of the memory by the first memory-access agent, subsequent to a confirmation that the suspension of writes is in force; and
wherein at least part of the other portions of the memory are write accessible by one or more of the plurality of memory-access agents concurrently with the suspension of writes to the specified portion of the memory.

EC37. The device of EC36, wherein the specified portion of the memory is no more than a 1/N fraction of the memory, writes to the specified portion of the memory by the plurality of memory-access agents are delayed by the suspension of writes at most for an interval of time corresponding to the reading of the 1/N fraction of the memory, read/write access to the other portions of the memory are not delayed by the suspension of writes, and N is in accordance with a desired latency, a size of the memory, and a rate of the reading.

EC38. The device of EC36, wherein the suspension of writes is in force for less than one-thirty-second (1/32) of the memory at a time.

EC39. The device of EC36, wherein the suspension of writes is in force for no more than one-sixty-fourth (1/64) of the memory at a time.

EC40. The device of EC39, wherein activities performed by the plurality of memory-access agents are delayed by the suspension of writes at most for an interval of time corresponding to the reading of the one-sixty-fourth (1/64) of the memory.

EC41. The device of EC36, further comprising: means for deasserting the request by the first memory-access agent, subsequent to completion of the reading.

EC42. The device of EC41, wherein the means for asserting and the means for deasserting comprise the use of a lock bus.

EC43. The device of EC36, wherein the asserting and the confirmation implement a lock handshake, the reading is a locked fetch, the request is a lock request comprising a lock command and at least an address and a length of a lock region comprising the specified portion of the memory, the first memory-access agent is a DMA controller, and the plurality of memory-access agents otherwise comprise at least one memory-access agent that is a lockable function unit.

EC44. The device of EC36, wherein the first memory-access agent is a DMA controller.

EC45. The device of EC44, wherein the specified portion of the memory is a first portion of the memory and the DMA controller is a conventional DMA controller enabled to execute commands to perform transfers between the first portion of the memory and a second portion of the other portions of the memory.

EC46. The device of EC44, wherein the DMA controller is a single-ended DMA controller in a first sub-system and the single-ended DMA controller is enabled to execute commands to perform transfers between the specified portion of the memory and one or more DMA channels communicating with at least a second sub-system.

EC47. The device of EC36, wherein the first memory-access agent is a DMA controller enabled to process a scatter-gather list (SGL) comprising a plurality of entries corresponding respectively to a plurality of non-contiguous portions of the memory to be transferred, wherein each of the entries is enabled to selectively specify a lock request for the corresponding respective portion of the memory, and the request for the suspension of writes to the specified portion of the memory is an instance of the lock request for an instance of one of the entries in the SGL.

EC48. The device of EC36, wherein the memory is a buffer memory, the first memory-access agent is a DMA controller, and the plurality of memory-access agents otherwise comprise at least one memory-access agent that maintains a data structure in the memory.

EC49. The device of EC37, wherein the memory is a buffer memory, the first memory-access agent is a DMA controller, the plurality of memory-access agents otherwise comprise a second memory-access agent that periodically updates an associated first data structure corresponding to the specified portion of the memory and a third memory-access agent that periodically updates an associated second data structure corresponding to the part of the other portions of the memory, and the third memory-access agent is enabled to perform the writing to the part of the other portions of the memory during the suspension of writes to the specified portion of the memory.

EC50. The device of EC49, wherein the buffer memory and the memory-access agents are comprised in a solid-state drive (SSD), and the first data structure and the second data structure comprise SSD operational information selectively written to flash memory of the SSD at least in part via the DMA controller.

EC51. The device of EC50, wherein the selective writing of the SSD operational information is comprised in a checkpoint written to the flash memory and enabling restoration of normal operation of the SSD subsequent to an event that disturbs the normal operation.

EC52. The device of EC51, wherein the SSD operational information written comprised in the checkpoint comprises at least one of statistics, configuration, and state.

EC53. The device of EC51, wherein the update of each data structure is at times delayed by the reading by the DMA controller in proportion to the size of each data structure, the update of each data structure is not delayed by the DMA controller reading the other data structures, and a total time required to update the SSD operational information comprised in the checkpoint is reduced compared to suspending writes at a larger granularity than each data structure.

EC54. The device of EC36, wherein the means for asserting asserts the request in response to a non-deterministic triggering event.

EC55. The device of EC36, wherein the memory-access agents and the memory are in a first sub-system and the triggering event originates from a second sub-system.

EC56. The device of EC55, wherein the first sub-system and the second sub-system are in different partitions of a same integrated circuit.

EC57. The device of EC55, wherein the first sub-system and the second sub-system are implemented in different intellectual property (IP) blocks.

EC58. The device of EC55, wherein the first sub-system and the second sub-system are in different integrated circuits.

EC59. The device of EC46, wherein the memory-access agents and the memory are in a first sub-system and the asserting is in response to a non-deterministic DMA fetch request originating from a second sub-system.

EC60. A system comprising:
a read DMA coupled between a first buffer memory and a function unit;
a write DMA coupled between the function unit and a second buffer memory;
wherein the read DMA is enabled to send to the function unit a header according to a read DMA command followed by data read from the first buffer memory according to the read DMA command, the header comprising function unit control information and a length field specifying a length of the data read from the first buffer memory and sent to the function unit;
wherein the function unit is operable to transform the data read from the first buffer memory according to the function unit control information; and
wherein the write DMA is enabled to write the transformed data from the function unit into the second buffer memory.

EC61. The system of EC60, wherein the transformed data from the function unit has a different length than the data read from the first buffer memory.

EC62. The system of EC61, wherein the function unit is further operable to send a modified header to the write DMA, the modified header having the length field specifying a length of the transformed data.

EC63. The system of EC62, wherein the write DMA is enabled to write an amount of data into the second buffer memory corresponding to the length field of the modified header.

EC64. The system of EC60, wherein the read DMA and the write DMA are enabled to be independently respectively programmed to perform the reading from the first buffer memory and the writing into the second buffer memory.

EC65. The system of EC60, wherein the write DMA writes the transformed data at a destination location in the second buffer memory in accordance with a write DMA command and the destination location need not be in accordance with the read DMA command.

EC66. The system of EC60, wherein the write DMA writes the transformed data in accordance with a write DMA command associated with an operation tag.

EC67. The system of EC66, wherein the operation tag associated with the write DMA operation is also associated with the read DMA command.

EC68. The system of EC66, wherein the operation tag associated with the write DMA operation is different than an operation tag associated with the read DMA command.

EC69. The system of EC66, wherein the operation tag associated with the write DMA operation is specified by source information in the header sent by the read DMA.

EC70. The system of EC66, wherein the function unit control information specifies that the transformation comprises encryption.

EC71. The system of EC66, wherein the function unit control information specifies that the transformation comprises decryption.

EC72. The system of EC66, wherein the function unit control information specifies use of a cryptographic key.

EC73. The system of EC66, wherein the function unit control information specifies the use of a particular cryptographic key of a plurality of cryptographic keys.

EC74. The system of EC66, wherein the function unit control information specifies that the transformation comprises use of a CRC.

EC75. The system of EC66, wherein the function unit control information specifies that the transformation comprises use of compression.

EC76. The system of EC67, wherein the data read from the first buffer memory, the data transformed by the function unit, and data written to the second buffer memory, comprise different aspects of a same DMA-operation.

EC77. The system of EC67, wherein the read DMA command and the write DMA command are enabled to be programmed at different times and by different software agents.

EC78. The system of EC77, wherein the data read from the first buffer memory, the data transformed by the function unit, and data written to the second buffer memory, are decoupled sub-operations of a same DMA operation.

EC79. The system of EC78, wherein the write DMA command comprises a destination location, of the second buffer memory, that need not be provided to the read DMA.

EC80. The system of EC78, wherein the data read from the first buffer memory, the data transformed by the function unit, and data written to the second buffer memory, selectively according to the data read exceeding a data frame size, are each decomposed into a plurality of data frames that all share the same operation tag and are different portions of the same DMA operation.

EC81. The system of EC80, wherein the plurality of data frames sharing the same operation tag are enabled to be processed out-of-order.

EC82. The system of EC60, wherein at least one of the first buffer memory and the second buffer memory is multi-ported.

EC83. The system of EC60, wherein the read DMA and the write DMA are implemented in separate integrated circuits.

EC84. The system of EC60, wherein the read DMA and the write DMA are implemented in separate partitions of a same integrated circuit.

EC85. The system of EC60, wherein the read DMA communicates with the function unit via a selected one of a plurality of DMA channels.

EC86. The system of EC60, wherein the read DMA communicates with the function unit via a demultiplexer.

EC87. The system of EC60, wherein the read DMA communicates with the function unit via a datapath having multiple sources and multiple receivers.

EC88. The system of EC60, wherein the read DMA communicates with the function unit via a cross-point switch.

EC89. The system of EC60, wherein the write DMA communicates with the function unit via a FIFO and a multiplexer.

EC90. The system of EC60, wherein the write DMA communicates with the function unit via a selected one of a plurality of channels.

EC91. The system of EC60, wherein the function unit is a first function unit of a plurality of function units coupled to the read DMA, the read DMA command is a first read command of a plurality of read commands, the data read from the first buffer memory is data of a first area of a plurality of areas of the first buffer memory, and the read DMA reads data from a particular area of the areas of the first buffer memory and sends the data read from the particular area to a particular function unit of the function units in accordance with each read command.

EC92. The system of EC60, wherein the read DMA and the write DMA are implemented in an flash memory controller enabled to communicate with a host and further enabled to manage flash memory, and the first buffer memory is enabled to receive data from the host and the second buffer memory is enabled to provide data to the flash memory.

EC93. The system of EC92, wherein the flash memory controller and the flash memory comprise a solid-state drive (SSD).

EC94. The system of EC60, wherein the function unit comprises function logic selectively performing at least one of general purpose processing, application-specific processing, pass-through, data compression, cryptography, error correcting coding, error detecting coding, checkpoint data generation, a predetermined mathematical manipulation, and a predetermined logical manipulation.

EC95. A method comprising:
reading data from a first buffer memory by a read DMA in accordance with a read DMA command;
sending to a function unit, in accordance with the read DMA command, a header followed by the data;
transforming the data by the function unit in accordance with function unit control information comprised in the header; and
writing the transformed data from the function unit into a second buffer memory by a write DMA in accordance with a write DMA command.

EC96. The method of EC95, further comprising:
programming the read DMA command independently of programming the write DMA command.

EC97. The method of EC95, wherein the sending is via a selected one of a plurality of DMA channels.

EC98. The method of EC95, further comprising:
associating the read DMA command with a source operation tag;
associating the write DMA command with a receive operation tag; and
wherein the source operation tag and the receive operation tag are different.

EC99. The method of EC95, wherein the read DMA command is associated with a source operation tag, the write DMA command is associated with a receive operation tag, and the source operation tag and the receive operation tag are identical.

EC100. The method of EC95, wherein the read DMA command is associated with a source operation tag, the write DMA command is associated with a receive operation tag, and the receive operation tag is specified in the header sent to the function unit.

EC101. The method of EC95, wherein the transforming comprises a selected one or more of encryption, decryption, use of a CRC, compression, and decompression.

EC102. The method of EC95, wherein the write DMA command comprises a destination location, of the second buffer memory, that need not be provided to the read DMA.

EC103. The method of EC95, wherein the read DMA and the write DMA are respectively in a first sub-system and a second sub-system.

EC104. The method of EC103, wherein the first sub-system and the second sub-system are in different partitions of a same integrated circuit.

EC105. The method of EC103, wherein the first sub-system and the second sub-system are implemented in different intellectual property (IP) blocks.

EC106. The method of EC103, wherein the first sub-system and the second sub-system are in different integrated circuits.

EC107. The method of EC103, wherein at least some destination attributes required by the write DMA need not be provided to the read DMA and at least some source attributes required by the read DMA need not be provided to the write DMA.

EC108. The method of EC103, wherein a destination location provided to the write DMA for the writing into the second buffer memory need not be provided to the read DMA, and a source location provided to the read DMA for the reading from the first buffer memory need not be provided to the write DMA.

EC109. The method of EC103, wherein the reading and the sending are in response to a non-deterministic DMA fetch request originating from the write DMA.

EC110. The method of EC95, further comprising:
respectively performing the reading, sending, transforming, and writing in data frame sized units that are different portions of the same DMA operation.

EC111. The method of EC110, further comprising:
processing out-of-order the data frame sized units of the same DMA operation.

EC112. The method of EC110, wherein the data frame sized units of the same DMA operation all share the same source operation tag.

EC113. The method of EC110, wherein the data frame sized units of the same DMA operation all share the same operation tag.

EC114. The method of EC95, further comprising:
receiving the data into the first buffer memory from a host;
writing the data from the second buffer memory into a flash memory; and
wherein the read DMA, the write DMA, the first buffer memory, the second buffer memory, and the function unit, are comprised in a flash memory controller.

EC115. The method of EC114, wherein the data received from the host is via a storage interface of the flash memory controller, and the flash memory controller and the flash memory are comprised in a solid-state disk (SSD).

EC116. The method of EC95, wherein the function unit comprises function logic selectively performing at least one of general purpose processing, application-specific processing, pass-through, data compression, cryptography, error correcting coding, error detecting coding, checkpoint data generation, a predetermined mathematical manipulation, and a predetermined logical manipulation.

EC117. A device comprising:
means for reading data from a first buffer memory by the read DMA in accordance with a read DMA command;
means for sending to a function unit, in accordance with the read DMA command, a header followed by the data;
means for transforming the data by the function unit in accordance with function unit control information comprised in the header; and
means for writing the transformed data from the function unit into a second buffer memory by the write DMA in accordance with a write DMA command.

EC118. The device of EC117, wherein the means for sending comprises a means for selecting one of a plurality of DMA channels.

EC119. The device of EC117, further comprising:
means for associating the read DMA command with a source operation tag;
means for associating the write DMA command with a receive operation tag; and
wherein the source operation tag and the receive operation tag are different.

EC120. The device of EC117, wherein the read DMA command is associated with a source operation tag, the write DMA command is associated with a receive operation tag, and the source operation tag and the receive operation tag are identical.

EC121. The device of EC117, wherein the read DMA command is associated with a source operation tag, the write DMA command is associated with a receive operation tag, and the receive operation tag is specified in the header sent to the function unit.

EC122. The device of EC117, wherein the means for transforming comprises a selected one or more of a means for encryption, a means for decryption, a means for use of a CRC, a means for compression, and a means for decompression.

EC123. The device of EC117, wherein the write DMA command comprises a destination location, of the second buffer memory, that need not be provided to the read DMA.

EC124. The device of EC117, wherein the read DMA and the write DMA are in different integrated circuits.

EC125. The device of EC117, wherein the read DMA and the write DMA are in different partitions of a same integrated circuit.

EC126. The device of EC117, further comprising:
means for respectively performing the reading, sending, transforming, and writing in data frame sized units that are different portions of the same DMA operation.

EC127. The device of EC126, further comprising:
means for processing out-of-order the data frame sized units of the same DMA operation.

EC128. The device of EC126, wherein the data frame sized units of the same DMA operation all share the same source operation tag.

EC129. The device of EC126, wherein the data frame sized units of the same DMA operation all share the same operation tag.

EC130. The device of EC117, further comprising:

means for receiving the data into the first buffer memory from a host;

means for writing the data from the second buffer memory into a flash memory; and wherein the read DMA, the write DMA, the first buffer memory, the second buffer memory, and the function unit, are comprised in a flash memory controller.

EC131. The device of EC130, wherein the data received from the host is via a storage interface of the flash memory controller, and the flash memory controller and the flash memory are comprised in a solid-state disk (SSD).

EC132. The device of EC117, wherein the function unit comprises function logic selectively performing at least one of general purpose processing, application-specific processing, pass-through, data compression, cryptography, error correcting coding, error detecting coding, checkpoint data generation, a predetermined mathematical manipulation, and a predetermined logical manipulation.

EC133. A method comprising:

programming a read DMA with a plurality of read DMA commands, each of the read DMA commands having a respective DMA command number, an associated respective read DMA operation to access a buffer memory, and associated respective read DMA control information;

separately programming a write DMA with a plurality of write DMA commands, each of the write DMA commands having a respective one of the DMA command numbers, an associated respective write DMA operation to access a buffer memory, and associated respective write DMA control information;

in response to receipt of a fetch indication specifying a particular one of the DMA command numbers, reading, by the read DMA, read data from the buffer memory according to the read DMA operation associated with the particular DMA command number, and sending by the read DMA a first frame comprising a respective header and respective data, the header comprising the particular DMA command number and a length of the read data, the respective data being the read data;

parsing, by the write DMA, a respective header of a second frame to determine the particular DMA command number and a length of respective data of the second frame; and writing, by the write DMA, the respective data of the second frame to the buffer memory according to the write DMA operation associated with the particular DMA command number and according to the length of the respective data of the second frame.

EC134. The method of EC133, wherein the second frame is same as the first frame.

EC135. The method of EC133, further comprising:

receiving, by an intermediate function unit, the first frame and transforming the first frame to produce the second frame; and wherein the respective data of the second frame is not same as the respective data of the first frame.

EC136. The method of EC135, wherein the respective header of the first frame comprises at least some of the read DMA control information associated with the particular DMA command number; and wherein the transforming is according to the at least some of the read DMA control information associated with the particular DMA command number.

EC137. The method of EC135, wherein the transforming comprises compression; and wherein the length of the respective data of the second frame is less than the length of the read data.

EC138. The method of EC135, wherein the intermediate function unit comprises function logic selectively performing at least one of general purpose processing, application-specific processing, pass-through, data compression, cryptography, error correcting coding, error detecting coding, checkpoint data generation, a predetermined mathematical manipulation, and a predetermined logical manipulation.

EC139. The method of EC133, wherein the programming of the read DMA with the one of the read DMA commands associated with the particular DMA command number comprises the fetch indication.

EC140. The method of EC133, wherein a first processor is enabled to perform the programming of the read DMA;

wherein a second processor different from the first processor is enabled to perform the programming of the write DMA; and further comprising sending, by the second processor, the fetch indication.

System

In some embodiments, a device, e.g. a storage device and/or an I/O device, such as an SSD, includes an SSD controller. The SSD controller acts as a bridge between the host interface and NVM of the SSD, and executes commands of a host protocol sent from a computing host via a host interface of the SSD. At least some of the commands direct the SSD to write and read the NVM with data sent from and to the computing host, respectively. In further embodiments, the SSD controller is enabled to use a map to translate between LBAs of the host protocol and physical storage addresses in the NVM. In further embodiments, at least a portion of the map is used for private storage (not visible to the computing host) of the I/O device. For example, a portion of the LBAs not accessible by the computing host is used by the I/O device to manage access to logs, statistics, or other private data.

In some embodiments, accessing compressed data of varying-sized quanta in NVM provides improved storage efficiency in some usage scenarios. For example, an SSD controller receives (uncompressed) data from a computing host (e.g., relating to a disk write command), compresses the data, and stores the compressed data into flash memory. In response to a subsequent request from the computing host (e.g., relating to a disk read command), the SSD controller reads the compressed data from the flash memory, uncompresses the compressed data, and provides the uncompressed data to the computing host. The compressed data is stored in the flash memory according to varying-sized quanta, the quanta size varying due to, e.g., compression algorithm, operating mode, and compression effectiveness on various data. The SSD controller uncompresses the data in part by consulting an included map table to determine where header(s) are stored in the flash memory. The SSD controller parses the header(s) obtained from the flash memory to determine where appropriate (compressed) data is stored in the flash memory. The SSD controller uncompresses the appropriate data from the flash memory to produce the uncompressed data to provide to the computing host. In the instant application, uncompress (and variants thereof) is synonymous with decompress (and variants thereof).

In various embodiments, an SSD controller includes a host interface for interfacing with a computing host, an interface for interfacing with NVM such as flash memory, and circuitry for controlling the interfaces and performing (and/or controlling various aspects of the performing) compressing and uncompressing, as well as lower-level redundancy and/or error correction, higher-level redundancy and/or error correction, and dynamic higher-level redundancy mode management with independent silicon elements.

According to various embodiments, some host interfaces are compatible with one or more of a USB interface standard, a CF interface standard, an MMC interface standard, an eMMC interface standard, a Thunderbolt interface standard, a UFS interface standard, an SD interface standard, a Memory Stick interface standard, an xD-picture card interface standard, an IDE interface standard, a SATA interface standard, a SCSI interface standard, a SAS interface standard, and a PCIe interface standard. According to various embodiments, the computing host is all or any portions of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game. In some embodiments, an interfacing host (such as a SAS/SATA bridge) operates as a computing host and/or as a bridge to a computing host.

In various embodiments, the SSD controller includes one or more processors. The processors execute firmware to control and/or perform operation of the SSD controller. The SSD controller communicates with the computing host to send and receive commands and/or status as well as data. The computing host executes one or more of an operating system, a driver, and an application. Communication by the computing host with the SSD controller is optionally and/or selectively via the driver and/or via the application. In a first example, all communication to the SSD controller is via the driver, and the application provides higher-level commands to the driver that the driver translates into specific commands for the SSD controller. In a second example, the driver implements a bypass mode and the application is enabled to send specific commands to the SSD controller via the driver. In a third example, a PCIe SSD controller supports one or more Virtual Functions (VFs), enabling an application, once configured, to communicate directly with the SSD controller, bypassing the driver.

According to various embodiments, some SSDs are compatible with form-factors, electrical interfaces, and/or protocols used by magnetic and/or optical non-volatile storage, such as HDDs, CD drives, and DVD drives. In various embodiments, SSDs use various combinations of zero or more parity codes, zero or more RS codes, zero or more BCH codes, zero or more Viterbi or other trellis codes, and zero or more LDPC codes.

FIG. 1A illustrates selected details of an embodiment of an SSD including an SSD controller providing various techniques for implementing a decoupled locking DMA architecture, as well as circuitry for managing non-volatile storage, such as flash memories. The SSD controller is for managing non-volatile storage, such as implemented via NVM elements (e.g., flash memories). SSD Controller 100 is communicatively coupled via one or more External Interfaces 110 to a host (not illustrated). According to various embodiments, External Interfaces 110 are one or more of: a SATA interface; a SAS interface; a PCIe interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, SSD Controller 100 includes a SATA interface and a PCIe interface.

SSD Controller 100 is further communicatively coupled via one or more Device Interfaces 190 to NVM 199 including one or more storage devices, such as one or more instances of Flash Device 192. According to various embodiments, Device Interfaces 190 are one or more of: an asynchronous interface; a synchronous interface; a single-data-rate (SDR) interface; a double-data-rate (DDR) interface; a DRAM-compatible DDR or DDR2 synchronous interface; an ONFI compatible interface, such as an ONFI 2.2 or ONFI 3.0 compatible interface; a Toggle-mode compatible flash interface; a non-standard version of any of the preceding interfaces; a custom interface; or any other type of interface used to connect to storage devices.

Each of Flash Device 192 has, in some embodiments, one or more individual Flash Die 194. According to type of a particular one of Flash Device 192, a plurality of Flash Die 194 in the particular Flash Device 192 is optionally and/or selectively accessible in parallel. Flash Device 192 is merely representative of one type of storage device enabled to communicatively couple to SSD Controller 100. In various embodiments, any type of storage device is usable, such as an SLC NAND flash memory, MLC NAND flash memory, NOR flash memory, flash memory using polysilicon or silicon nitride technology-based charge storage cells, two- or three-dimensional technology-based flash memory, read-only memory, static random access memory, dynamic random access memory, ferromagnetic memory, phase-change memory, racetrack memory, ReRAM, or any other type of memory device or storage medium.

According to various embodiments, Device Interfaces 190 are organized as: one or more busses with one or more instances of Flash Device 192 per bus; one or more groups of busses with one or more of instances Flash Device 192 per bus, having busses in a group generally accessed in parallel; or any other organization of one or more instances of Flash Device 192 onto Device Interfaces 190.

Continuing in FIG. 1A, SSD Controller 100 has one or more modules, such as Host Interfaces 111, Data Processing 121, Buffer 131, Map 141, Recycler 151, ECC 161, Device Interface Logic 191, and CPU 171. The specific modules and interconnections illustrated in FIG. 1A are merely representative of one embodiment, and many arrangements and interconnections of some or all of the modules, as well as additional modules not illustrated, are conceived. In a first example, in some embodiments, there are two or more Host Interfaces 111 to provide dual-porting. In a second example, in some embodiments, Data Processing 121 and/or ECC 161 are combined with Buffer 131. In a third example, in some embodiments, Host Interfaces 111 is directly coupled to Buffer 131, and Data Processing 121 optionally and/or selectively operates on data stored in Buffer 131. In a fourth example, in some embodiments, Device Interface Logic 191 is directly coupled to Buffer 131, and ECC 161 optionally and/or selectively operates on data stored in Buffer 131.

Host Interfaces 111 sends and receives commands and/or data via External Interfaces 110, and, in some embodiments, tracks progress of individual commands via Tag Tracking 113. For example, the commands include a read command specifying an address (such as an LBA) and an amount of data (such as a number of LBA quanta, e.g., sectors) to read; in response the SSD provides read status and/or read data. For another example, the commands include a write command specifying an address (such as an LBA) and an amount of data (such as a number of LBA quanta, e.g., sectors) to write; in response the SSD provides write status and/or requests write data and optionally subsequently provides write status. For yet another example, the commands include a de-allocation command (e.g. a trim command) specifying one or more addresses (such as one or more LBAs) that no longer need be allocated; in response the SSD modifies the Map accordingly and optionally provides de-allocation status. In some contexts an ATA compatible TRIM command is an exemplary de-allocation command. For yet another example, the commands include a super capacitor test command or a data hardening success query; in response, the SSD provides appropriate status. In some embodiments, Host Interfaces 111 is compatible with a SATA protocol and, using NCQ commands, is enabled to have up to 32 pending commands, each with a unique tag represented as a number from 0 to 31. In some embodiments, Tag Tracking 113 is enabled to associate an external tag for a command received via External Interfaces 110 with an internal tag used to track the command during processing by SSD Controller 100.

According to various embodiments, one or more of: Data Processing 121 optionally and/or selectively processes some or all data sent between Buffer 131 and External Interfaces 110; and Data Processing 121 optionally and/or selectively processes data stored in Buffer 131. In some embodiments, Data Processing 121 uses one or more Engines 123 to perform one or more of: formatting; reformatting; transcoding; and any other data processing and/or manipulation task.

Buffer 131 stores data sent to/from External Interfaces 110 from/to Device Interfaces 190. In some embodiments, Buffer 131 additionally stores system data, such as some or all map tables, used by SSD Controller 100 to manage one or more instances of Flash Device 192. In various embodiments, Buffer 131 has one or more of: Memory 137 used for temporary storage of data; DMA 133 used to control movement of data to and/or from Buffer 131; and ECC-X 135 used to provide higher-level error correction and/or redundancy functions; and other data movement and/or manipulation functions. An example of a higher-level redundancy function is a RAID-like capability (e.g. RASIE), with redundancy at a flash device level (e.g., multiple ones of Flash Device 192) and/or a flash die level (e.g., Flash Die 194) instead of at a disk level.

According to various embodiments, one or more of: ECC 161 optionally and/or selectively processes some or all data sent between Buffer 131 and Device Interfaces 190; and ECC 161 optionally and/or selectively processes data stored in Buffer 131. In some embodiments, ECC 161 is used to provide lower-level error correction and/or redundancy functions, such as in accordance with one or more ECC techniques. In some embodiments, ECC 161 implements one or more of: a CRC code; a Hamming code; an RS code; a BCH code; an LDPC code; a Viterbi code; a trellis code; a hard-decision code; a soft-decision code; an erasure-based code; any error detecting and/or correcting code; and any combination of the preceding. In some embodiments, ECC 161 includes one or more decoders (such as LDPC decoders).

Device Interface Logic 191 controls instances of Flash Device 192 via Device Interfaces 190. Device Interface Logic 191 is enabled to send data to/from the instances of Flash Device 192 according to a protocol of Flash Device 192. Device Interface Logic 191 includes Scheduling 193 to selectively sequence control of the instances of Flash Device 192 via Device Interfaces 190. For example, in some embodiments, Scheduling 193 is enabled to queue operations to the instances of Flash Device 192, and to selectively send the operations to individual ones of the instances of Flash Device 192 (or Flash Die 194) as individual ones of the instances of Flash Device 192 (or Flash Die 194) are available.

Map 141 converts between data addressing used on External Interfaces 110 and data addressing used on Device Interfaces 190, using Table 143 to map external data addresses to locations in NVM 199. For example, in some embodiments, Map 141 converts LBAs used on External Interfaces 110 to block and/or page addresses targeting one or more Flash Die 194, via mapping provided by Table 143. For LBAs that have never been written since drive manufacture or de-allocation, the Map points to a default value to return if the LBAs are read. For example, when processing a de-allocation command, the Map is modified so that entries corresponding to the de-allocated LBAs point to one of the default values. In various embodiments, there are various default values, each having a corresponding pointer. The plurality of default values enables reading some de-allocated LBAs (such as in a first range) as one default value, while reading other de-allocated LBAs (such as in a second range) as another default value. The default values, in various embodiments, are defined by flash memory, hardware, firmware, command and/or primitive arguments and/or parameters, programmable registers, or various combinations thereof.

In some embodiments, Map 141 uses Table 143 to perform and/or to look up translations between addresses used on External Interfaces 110 and data addressing used on Device Interfaces 190. According to various embodiments, Table 143 is one or more of: a one-level map; a two-level map; a multi-level map; a map cache; a compressed map; any type of mapping from one address space to another; and any combination of the foregoing. According to various embodiments, Table 143 includes one or more of: static random access memory; dynamic random access memory; NVM (such as flash memory); cache memory; on-chip memory; off-chip memory; and any combination of the foregoing.

In some embodiments, Recycler 151 performs garbage collection. For example, in some embodiments, instances of Flash Device 192 contain blocks that must be erased before the blocks are re-writeable. Recycler 151 is enabled to determine which portions of the instances of Flash Device 192 are actively in use (e.g., allocated instead of de-allocated), such as by scanning a map maintained by Map 141, and to make unused (e.g., de-allocated) portions of the instances of Flash Device 192 available for writing by erasing the unused portions. In further embodiments, Recycler 151 is enabled to move data stored within instances of Flash Device 192 to make larger contiguous portions of the instances of Flash Device 192 available for writing.

In some embodiments, instances of Flash Device 192 are selectively and/or dynamically configured, managed, and/or used to have one or more bands for storing data of different types and/or properties. A number, arrangement, size, and type of the bands are dynamically changeable. For example, data from a computing host is written into a hot (active) band, while data from Recycler 151 is written into a cold (less active) band. In some usage scenarios, if the computing host writes a long, sequential stream, then a size of the hot band grows, whereas if the computing host does random writes or few writes, then a size of the cold band grows.

CPU 171 controls various portions of SSD Controller 100. CPU 171 includes CPU Core 172. CPU Core 172 is, according to various embodiments, one or more single-core or multi-core processors. The individual processors cores in CPU Core 172 are, in some embodiments, multi-threaded. CPU Core 172 includes instruction and/or data caches and/or memories. For example, the instruction memory contains instructions to enable CPU Core 172 to execute programs (e.g. software sometimes called firmware) to control SSD Controller 100. In some embodiments, some or all of the firmware executed by CPU Core 172 is stored on instances of Flash Device 192 (as illustrated, e.g., as Firmware 106 of NVM 199 in FIG. 1B).

In various embodiments, CPU 171 further includes: Command Management 173 to track and control commands received via External Interfaces 110 while the commands are in progress; Buffer Management 175 to control allocation and use of Buffer 131; Translation Management 177 to control Map 141; Coherency Management 179 to control consistency of data addressing and to avoid conflicts such as between external data accesses and recycle data accesses; Device Management 181 to control Device Interface Logic 191; Identity Management 182 to control modification and communication of identify information, and optionally other management units. None, any, or all of the management functions performed by CPU 171 are, according to various embodiments, controlled and/or managed by hardware, by software (such as firmware executing on CPU Core 172 or on a host connected via External Interfaces 110), or any combination thereof.

In some embodiments, CPU 171 is enabled to perform other management tasks, such as one or more of: gathering and/or reporting performance statistics; implementing SMART; controlling power sequencing, controlling and/or monitoring and/or adjusting power consumption; responding to power failures; controlling and/or monitoring and/or adjusting clock rates; and other management tasks.

Various embodiments include a computing-host flash memory controller that is similar to SSD Controller 100 and is compatible with operation with various computing hosts, such as via adaptation of Host Interfaces 111 and/or External Interfaces 110. The various computing hosts include one or any combination of a computer, a workstation computer, a server computer, a storage server, a SAN, a NAS device, a DAS device, a storage appliance, a PC, a laptop computer, a notebook computer, a netbook computer, a tablet device or computer, an ultrabook computer, an electronic reading device (such as an e-reader), a PDA, a navigation system, a (handheld) GPS device, an automotive control system, an automotive media control system or computer, a printer, copier or fax machine or all-in-one device, a POS device, a cash-register, a media player, a television, a media recorder, a DVR, a digital camera, a cellular handset, a cordless telephone handset, and an electronic game.

In various embodiments, all or any portions of an SSD controller (or a computing-host flash memory controller) are implemented on a single IC, a single die of a multi-die IC, a plurality of dice of a multi-die IC, or a plurality of ICs. For example, Buffer 131 is implemented on a same die as other elements of SSD Controller 100. For another example, Buffer 131 is implemented on a different die than other elements of SSD Controller 100.

Figure 1B:
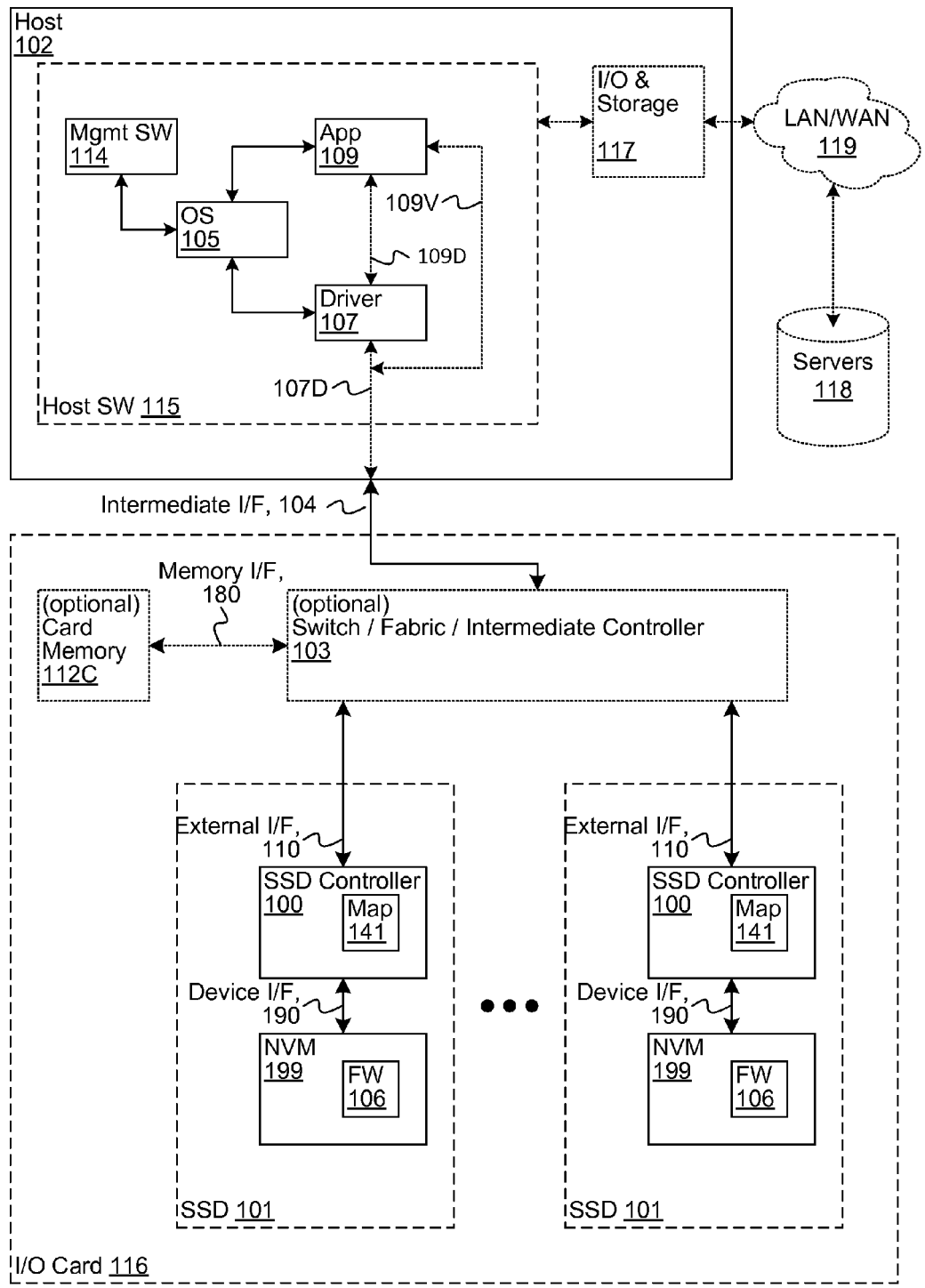
FIG. 1B illustrates selected details of various embodiments of systems including one or more instances of the SSD of FIG. 1A.

FIG. 1B illustrates selected details of various embodiments of systems including one or more instances of the SSD of FIG. 1A. SSD 101 includes SSD Controller 100 coupled to NVM 199 via Device Interfaces 190. The figure illustrates various classes of embodiments: a single SSD coupled directly to a host, a plurality of SSDs each respectively coupled directly to a host via respective external interfaces, and one or more SSDs coupled indirectly to a host via various interconnection elements.

As an example embodiment of a single SSD coupled directly to a host, one instance of SSD 101 is coupled directly to Host 102 via External Interfaces 110 (e.g. Switch/Fabric/Intermediate Controller 103 is omitted, bypassed, or passed-through). As an example embodiment of a plurality of SSDs each coupled directly to a host via respective external interfaces, each of a plurality of instances of SSD 101 is respectively coupled directly to Host 102 via a respective instance of External Interfaces 110 (e.g. Switch/Fabric/Intermediate Controller 103 is omitted, bypassed, or passed-through). As an example embodiment of one or more SSDs coupled indirectly to a host via various interconnection elements, each of one or more instances of SSD 101 is respectively coupled indirectly to Host 102. Each indirect coupling is via a respective instance of External Interfaces 110 coupled to Switch/Fabric/Intermediate Controller 103, and Intermediate Interfaces 104 coupling to Host 102.

Some of the embodiments including Switch/Fabric/Intermediate Controller 103 also include Card Memory 112C coupled via Memory Interface 180 and accessible by the SSDs. In various embodiments, one or more of the SSDs, the Switch/Fabric/Intermediate Controller, and/or the Card Memory are included on a physically identifiable module, card, or pluggable element (e.g. I/O Card 116). In some embodiments, SSD 101 (or variations thereof) corresponds to a SAS drive or a SATA drive that is coupled to an initiator operating as Host 102.

Host 102 is enabled to execute various elements of Host Software 115, such as various combinations of OS 105, Driver 107, Application 109, and Multi-Device Management Software 114. Dotted-arrow 107D is representative of Host Software ←→ I/O Device Communication, e.g. data sent/received to/from one or more of the instances of SSD 101 and from/to any one or more of OS 105 via Driver 107, Driver 107, and Application 109, either via Driver 107, or directly as a VF.

OS 105 includes and/or is enabled to operate with drivers (illustrated conceptually by Driver 107) for interfacing with the SSD. Various versions of Windows (e.g. 95, 98, ME, NT, XP, 2000, Server, Vista, and 7), various versions of Linux (e.g. Red Hat, Debian, and Ubuntu), and various versions of MacOS (e.g. 8, 9 and X) are examples of OS 105. In various embodiments, the drivers are standard and/or generic drivers (sometimes termed "shrink-wrapped" or "pre-installed") operable with a standard interface and/or protocol such as SATA, AHCI, or NVM Express, or are optionally customized and/or vendor-specific to enable use of commands specific to SSD 101. Some drives and/or drivers have pass-through modes to enable application-level programs, such as Application 109 via Optimized NAND Access (sometimes termed ONA) or Direct NAND Access (sometimes termed DNA) techniques, to communicate commands directly to SSD 101, enabling a customized application to use commands specific to SSD 101 even with a generic driver. ONA techniques include one or more of: use of non-standard modifiers (hints); use of vendor-specific commands; communication of non-standard statistics, such as actual NVM usage according to compressibility; and other techniques. DNA techniques include one or more of: use of non-standard commands or vendor-specific providing unmapped read, write, and/or erase access to the NVM; use of non-standard or vendor-specific commands providing more direct access to the NVM, such as by bypassing formatting of data that the I/O device would otherwise do; and other techniques. Examples of the driver are a driver without ONA or DNA support, an ONA-enabled driver, a DNA-enabled driver, and an ONA/DNA-enabled driver. Further examples of the driver are a vendor-provided, vendor-developed, and/or vendor-enhanced driver, and a client-provided, client-developed, and/or client-enhanced driver.

Examples of the application-level programs are an application without ONA or DNA support, an ONA-enabled application, a DNA-enabled application, and an ONA/DNA-enabled application. Dotted-arrow 109D is representative of Application ←→ I/O Device Communication (e.g. bypass via a driver or bypass via a VF for an application), e.g. an ONA-enabled application and an ONA-enabled driver communicating with an SSD, such as without the application using the OS as an intermediary. Dotted-arrow 109V is representative of Application ←→ I/O Device Communication (e.g. bypass via a VF for an application), e.g. a DNA-enabled application and a DNA-enabled driver communicating with an SSD, such as without the application using the OS or the driver as intermediaries.

One or more portions of NVM 199 are used, in some embodiments, for firmware storage, e.g. Firmware 106. The firmware storage includes one or more firmware images (or portions thereof). A firmware image has, for example, one or more images of firmware, executed, e.g., by CPU Core 172 of SSD Controller 100. A firmware image has, for another example, one or more images of constants, parameter values, and NVM device information, referenced, e.g. by the CPU core during the firmware execution. The images of firmware correspond, e.g., to a current firmware image and zero or more previous (with respect to firmware updates) firmware images. In various embodiments, the firmware provides for generic, standard, ONA, and/or DNA operating modes. In some embodiments, one or more of the firmware operating modes are enabled (e.g. one or more APIs are "unlocked") via keys or various software techniques, optionally communicated and/or provided by a driver.

In some embodiments lacking the Switch/Fabric/Intermediate Controller, the SSD is coupled to the Host directly via External Interfaces 110. In various embodiments, SSD Controller 100 is coupled to the Host via one or more intermediate levels of other controllers, such as a RAID controller. In some embodiments, SSD 101 (or variations thereof) corresponds to a SAS drive or a SATA drive and Switch/Fabric/Intermediate Controller 103 corresponds to an expander that is in turn coupled to an initiator, or alternatively Switch/Fabric/Intermediate Controller 103 corresponds to a bridge that is indirectly coupled to an initiator via an expander. In some embodiments, Switch/Fabric/Intermediate Controller 103 includes one or more PCIe switches and/or fabrics.

In various embodiments, such as some of the embodiments with Host 102 as a computing host (e.g. a computer, a workstation computer, a server computer, a storage server, a SAN, a NAS device, a DAS device, a storage appliance, a PC, a laptop computer, a notebook computer, and/or a netbook computer), the computing host is optionally enabled to communicate (e.g. via optional I/O & Storage Devices/Resources 117 and optional LAN/WAN 119) with one or more local and/or remote servers (e.g. optional Servers 118). The communication enables, for example, local and/or remote access, management, and/or usage of any one or more of SSD 101 elements. In some embodiments, the communication is wholly or partially via Ethernet. In some embodiments, the communication is wholly or partially via Fibre Channel. LAN/WAN 119 is representative, in various embodiments, of one or more Local and/or Wide Area Networks, such as any one or more of a network in a server farm, a network coupling server farms, a metro-area network, and the Internet.

In various embodiments, an SSD controller and/or a computing-host flash memory controller in combination with one or more NVMs are implemented as a non-volatile storage component, such as a USB storage component, a CF storage component, an MMC storage component, an eMMC storage component, a Thunderbolt storage component, a UFS storage component, an SD storage component, a Memory Stick storage component, and an xD-picture card storage component.

In various embodiments, all or any portions of an SSD controller (or a computing-host flash memory controller), or functions thereof, are implemented in a host that the controller is to be coupled with (e.g., Host 102 of FIG. 1B). In various embodiments, all or any portions of an SSD controller (or a computing-host flash memory controller), or functions thereof, are implemented via hardware (e.g., logic circuitry), software and/or firmware (e.g., driver software and/or SSD control firmware), or any combination thereof. For example, functionality of or associated with an ECC unit (such as similar to ECC 161 and/or ECC-X 135 of FIG. 1A) is implemented partially via software on a host and partially via a combination of firmware and hardware in an SSD controller. For another example, functionality of or associated with a recycler unit (such as similar to Recycler 151 of FIG. 1A) is implemented partially via software on a host and partially via hardware in a computing-host flash memory controller.

Decoupled Locking DMA Architecture

Figure 2:
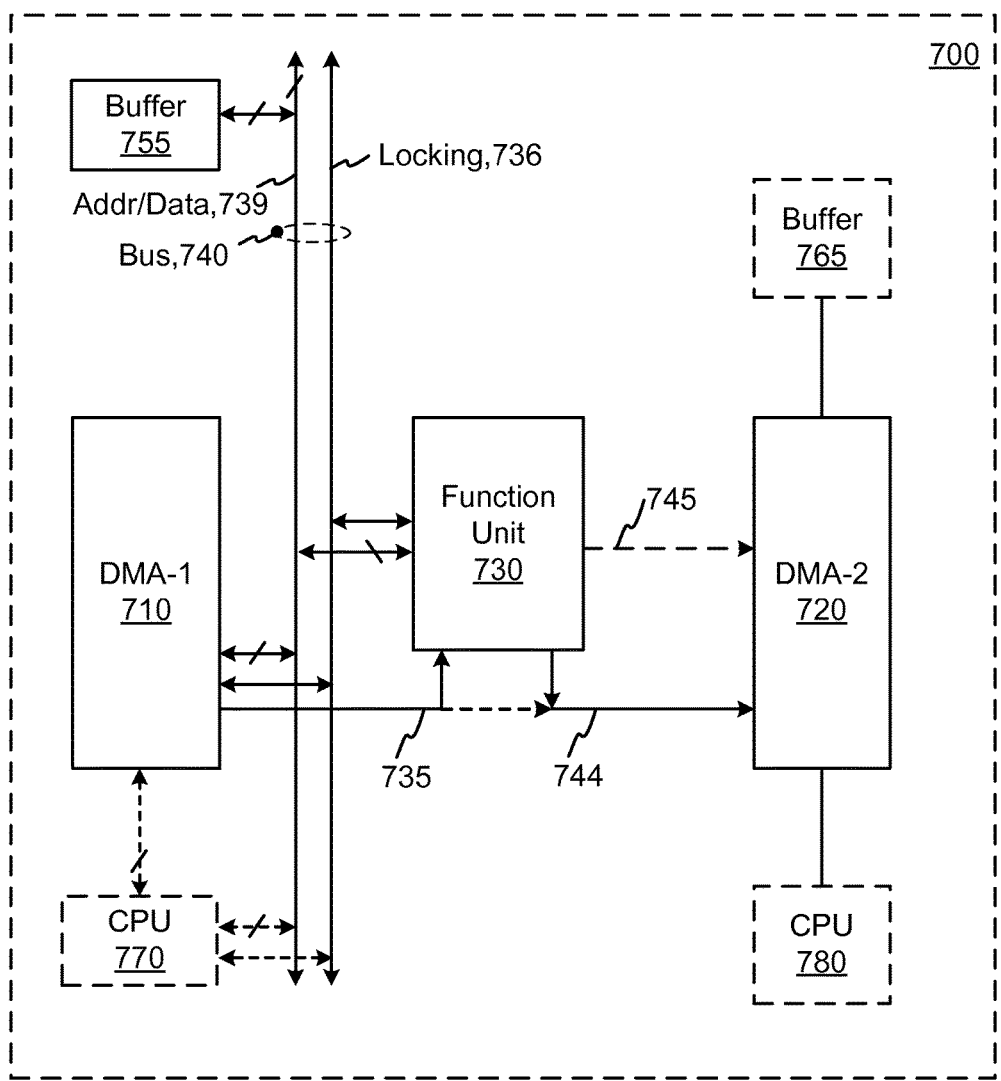
FIG. 2 illustrates selected details of an embodiment of a decoupled DMA arrangement.

In some embodiments, a portion of the functions performed by superblock 136 in FIG. 1A are performed by a decoupled DMA arrangement. FIG. 2 illustrates selected details of an embodiment of a decoupled DMA arrangement. DMA arrangement 700 comprises a first DMA, DMA-1 710, a second DMA, DMA-2 720, and a function unit 730 operatively coupled to DMA-1 710 and DMA-2 720. Function unit 730 performs one or more general purpose or application-specific processing functions, such as, pass-through, data compression, cryptography, error correcting/detecting coding, checkpoint data generation, or other mathematical or logical manipulation. Function unit 730 is operable to receive data from DMA-1 710, process the data according to a selected function, and provide processed data to DMA-2 720. Pass-through functions enable at least a portion of the data received by function unit 730 from DMA-1 710 to be transferred to DMA-2 720 without modification. Function unit 730 is discussed further below in conjunction with FIG. 5.

DMA-1 710 is coupled to function unit 730 via bus 735. Function unit 730 is coupled to DMA-2 720 via bus 744. In some embodiments, bus 735 and bus 744 are the same bus, as suggested by the dashed portion between them. In various embodiments, function unit 730 transfers data to DMA-2

720 employing a plurality of buses as illustrated by buses 744 and 745 wherein function unit 730 is operable to provide a first type of data on bus 744 and a second type of data on bus 745. In some embodiments, function unit 730 is operable to employ a first portion of data received to determine one or more functions to be performed and in various embodiments is operable to forward a portion of data received from DMA-1 710 as command/control information to DMA-2 720.

In some embodiments, function unit 730 provides bi-directional data processing wherein a) first data provided by DMA-1 710 is processed by function unit 730 and the processed first data is then provided to DMA-2 720; and b) second data provided by DMA-2 720 to function unit 730 is processed and the processed second data is then provided to DMA-1 710. In one example, function unit 730 provides ECC encoding when transferring data from DMA-1 710 to DMA-2 720; and provides error checking and/or correction when transferring data from DMA-1 720 to DMA-2 710.

DMA-1 710 comprises one or more ports, each of which provides an interface to at least one of a memory, I/O interface, or a bus comprising one or more signal lines, such as bus 735, for example. In some embodiments, system elements, such as Buffer 755 or other memories, are coupled to one or more buses, such as bus 740, comprising Address/Data (Addr/Data) sub-bus 739 and Locking sub-bus 736. The term memory-access agent is sometimes used herein for logic blocks (such as DMA-1 710, CPU 770, and Function Unit 730) that are enabled to perform at least one of read access or write access (such as performed over bus 740) with respect to a memory (such as buffer 755). Various DMA-1 710 embodiments comprise at least one port operable to couple to a CPU 770 and at least one port operable to couple to buffer 755 (via bus 740 as shown, or via a dedicated port/path as described next for DMA-2). Further embodiments comprise a port operable to receive information from DMA-2 720 and/or CPU 780. Similarly, some DMA-2 720 embodiments comprise a plurality of ports, at least one of the ports operable to receive information from function unit 730. Various DMA-2 720 embodiments comprise at least one port operable to interface with buffer 765 (via a dedicated port/path as shown, or via a bus such as described previously for DMA-1. In further embodiments, DMA-2 720 comprises at least one port operable to interface with CPU 780. In various embodiments of DMA arrangement 700, DMA-1 710 and DMA-2 720 interface to a same CPU.

Some DMA arrangement embodiments comprise locking signal 736 operable to inhibit a system element, such as function unit 730, to write and/or read access to a portion of data stored in the system, such as in a data buffer or memory, for example. In some embodiments, DMA-1 710 provides one or more locking signals. In various embodiments, some locking signals are provided by DMA-2 720 and/or some other locking signals are provided by DMA-1 710.

In some embodiments, DMA controller 710 and/or 720 support a plurality of DMA channels, enabling the DMA controller(s) to move data between a plurality of sources and/or destinations substantively in parallel, such as by sending some data for each channel in an interleaved fashion. In one example, the DMA controller(s) employ a form of time division multiple access (TDMA) to move portions of data for each of a plurality of source/destination pairs in an interleaved fashion. In another example, the DMA controller(s) couple to a crossbar interconnection enabling sending of data between different sources and different destinations in parallel.

Figure 3A:
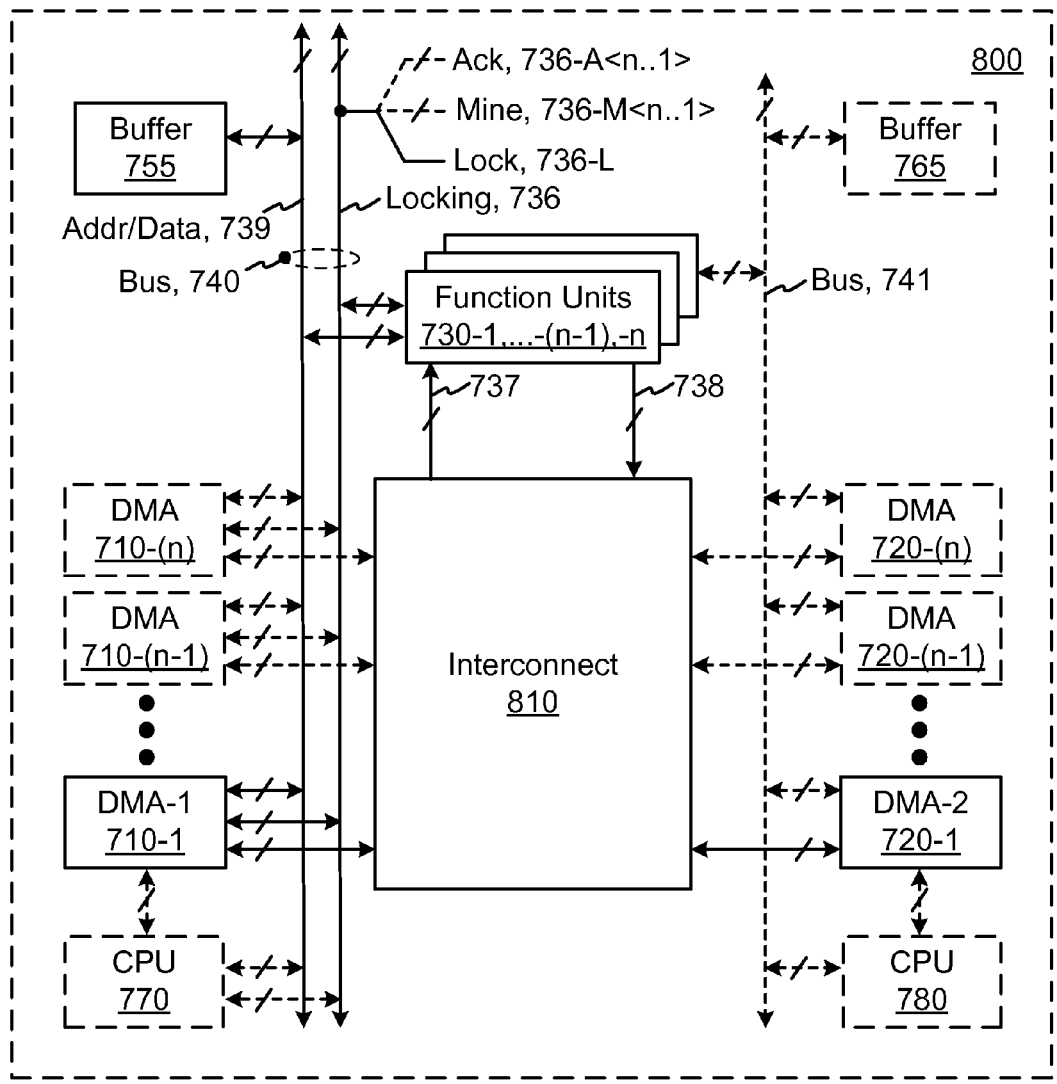
FIGS. 3A and 3B illustrate selected details of another embodiment of a decoupled DMA arrangement.
Figure 3B:
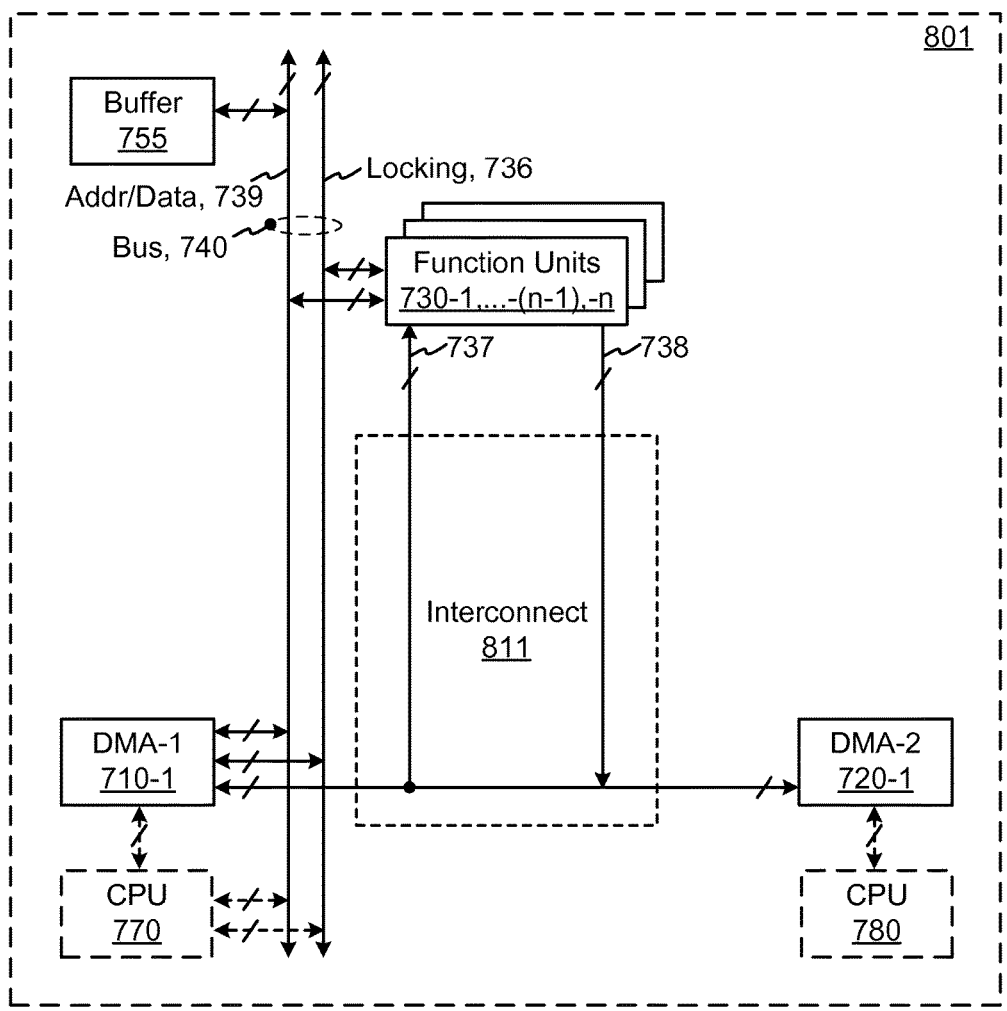

Various DMA arrangement embodiments are not limited as to the types or numbers of interconnections coupling various elements, nor are they limited to the number of instances of various elements. FIG. 3A illustrates selected details of another embodiment of a decoupled DMA arrangement. Arrangement 800 comprises one or more function units 730-1, . . . 730-(n−1), and 730-(n) and a plurality of DMA controllers coupled to interconnect 810 wherein DMA controllers and function units need not provide like capabilities. Furthermore, at least one of the DMA controllers is operable to provide a locking signal, such as Lock 736-L, which is enabled to be a component of sub-bus 736 of Bus 740, and as discussed in more detail in conjunction with FIG. 5 and elsewhere herein. Interconnect 810 comprises any type of interconnection circuitry, such as, cross-point switches, switching fabrics, on-chip networks, routers, and the like. Interconnect 811 of the DMA arrangement 801 of FIG. 3B illustrates but just one possible interconnect topology. Coupling of DMA controllers and one or more function units to interconnect 810 is not limited to any particular bus, signal line, or signaling format or formats. In some embodiments, at least one DMA bus comprises a data/control bus comprising a first plurality of data lines and a second plurality of auxiliary lines wherein auxiliary lines are operative to provide auxiliary information during a portion of a data transfer, the auxiliary information comprising an ID, first and last transfer data groups, or other information. In various embodiments, control lines are bidirectional, enabling a receiving element to communicate to a DMA various conditions and/or requests such as buffer near full, data acknowledge, task switch request, or any other type of communication. In some embodiments, one DMA of a plurality of DMA controllers is operable to send a broadcast message to a plurality of other DMA controllers. In some embodiments, transfers on a portion of interconnect 810 employ time division multiplexing wherein information associated with each of a plurality of tasks is placed on the portion of interface 810 at different time intervals. In various embodiments, interconnect 810 comprises a multipath architecture wherein data from a plurality of DMA channels is conveyed concurrently. As previously noted, the various function units and DMA controllers depicted in FIGS. 3A and 3B need not be of similar architecture. In some configurations, DMA-1 is configured to source (read) data from a memory, bus, port or other source and convey the data to DMA-2 (in some embodiments through a function unit, with or without processing) wherein DMA-2 receives the data and writes a portion of the data to a memory, bus, I/O interface, or other writable element. DMA controllers are not limited in function and in various embodiments are configurable as a source DMA, a receiver DMA, or both (via multiple channels, for example.)

Figure 4:
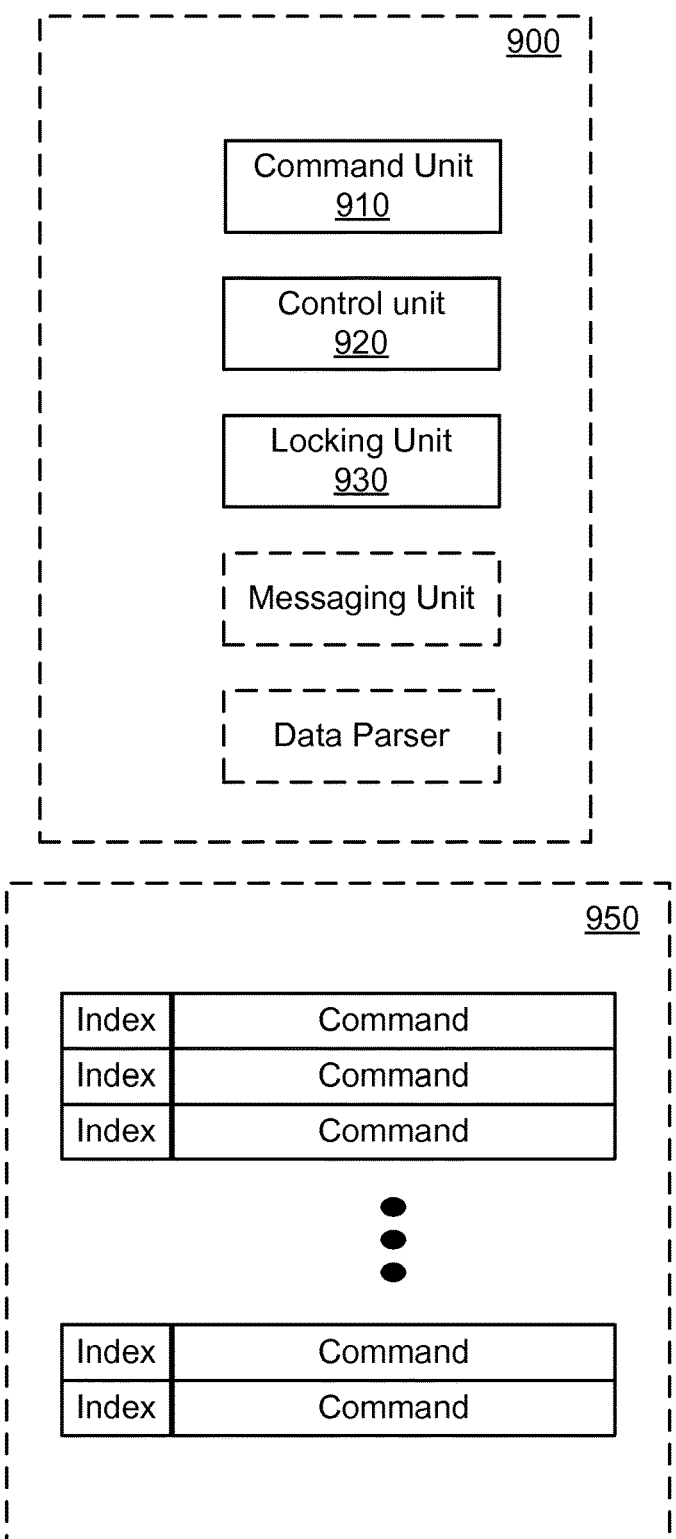
FIG. 4 illustrates selected details of an embodiment of a DMA controller.

FIG. 4 illustrates selected details of an embodiment of a DMA controller. Controller 900 comprises command unit 910, control unit 920, and locking unit 930. In some embodiments, command unit 910 comprises an indexed command store 950 such that one or more commands are selectable through an index value. Index values are obtained or derived in any manner or combination thereof, such as information from another command, information from a header or trailer portion of a data transfer, from auxiliary bus lines coupled to a port of the DMA controller, and from interrupts or other conditions, for example. In various embodiments, the command unit is operable to retrieve commands from a memory. Control unit 920 processes commands and performs operations such as data read and write operations. In some embodiments, locking unit 930 asserts a lock signal responsive to the execution of a command comprising a lock command. In various embodiments, locking unit 930 asserts a locking signal responsive to comparing an address derived from a command to a reference value. In further embodiments, locking unit 930 is operable to suspend processing of at least one command pending the receipt of an acknowledgment (ACK) signal following assertion of a locking signal. In various embodiments, some commands comprise a lock function and other commands comprise a lock with ACK function. In some embodiments, a lock signal is asserted and a predetermined/programmed amount of time (such as clock cycles for example) elapses prior to communication with a locked device. In further embodiments, a portion of data identifies a last transfer, such as in a header, trailer, or auxiliary information, for example, indicating that a lock is to be de-asserted after successful completion of the transfer.

In some embodiments of DMA controller 900, the DMA controller is operable to perform locking of a portion of memory being read and/or being written wherein a portion of a particular command of the DMA controller comprises a lock specification. (In various embodiments, a source specification and/or a destination specification comprise the lock specification and some fields, such as an address and/or a length, are common.) Prior to starting a data transfer in response to activation of the particular command, if the lock specification is enabled, the DMA controller sends a lock request to one or more function units (such as any combination of processors, H/W controllers, function units, and memory controllers, for example) that are optionally and/or selectively updating a same memory that the DMA is about to read according to the particular command. In some embodiments, the DMA controller waits for each of the one or more function units to return a response (or in further embodiments, waits for a fixed lock-time to elapse) and then performs a read of the memory according to the particular command. After the read of the memory is complete, the DMA controller sends an unlock request, removing the lock. In various embodiments, this comprises de-asserting a lock signal. During the time that the lock is in effect (between the response to the lock request and the unlock request), the one or more function units are inhibited from updating a locked portion of the memory.

In some embodiments, the lock request is global and the processors and/or H/W controllers stop all memory operation (or at least writing for a read lock) during the time that the lock is in effect. In various embodiments, the lock request specifies a particular one of a plurality of memories, and the one or more function units stop all memory operation (or at least writing for a read lock) to the particular memory. In further embodiments, the lock requests specifies a region of memory, such as by an address and/or a length, and the one or more function units stop all memory operation (or at least writing for a read lock) to a region of memory specified by the address and/or the length. The term "lock region" refers to the region of memory subject to a lock request.

According to various embodiments, one or more of: each of one or more DMA channels has a separate lock request interface; each of one or more DMA channels has a separate lock response interface; some DMA channels share a single lock request interface; some DMA channels share a single lock response interface; only one DMA channel has a lock request interface; and only one DMA channel has a lock response interface.

In some embodiments, the lock request comprises an address and/or a length of the region of the memory being read (or written) by the particular DMA command. In further embodiments, each element of a scatter-gather list is enabled to selectively operate with (or without) locking. For example, each element of the scatter-gather list is operable to request that a region of memory referred to by the element be locked prior to a memory operation by the DMA controller on the region. In further embodiments, the lock request comprises a handle or other reference that indicates the region or regions of memory being read (or written) by the particular DMA command. In still further embodiments, the DMA controller is enabled to optionally and/or selectively send a lock request and to wait for a lock response prior to performing a data transfer according to each element of a scatter-gather list.

In some embodiments, the DMA controller is configurable to perform transfers on one or more DMA channels that are not awaiting a lock response, concurrent with another one of the DMA channels waiting for a lock response. In some embodiments, one or more function units receiving a lock request wait for pending operations to the affected region of memory, if any, to complete, and then respond to the lock request.

In some embodiments, each of the one or more function units is operable to maintain a respective one or more of the data structures, and is operable to determine if a lock request falls within and/or overlaps with any memory region occupied by the respective one or more data structures. For example, the one or more function units maintain information comprising the memory regions occupied by the data structures contained within or accessed by the function unit(s). In further embodiments, an error occurs if a lock region overlaps with a data structure (as opposed to being a subset or all of the data structure). In various embodiments, a transfer request comprises a base address and a length and the one or more function units are operable to compare the range of the transfer request with the information comprising the memory regions occupied by a data structure. In some embodiments, the lock request raises, or otherwise asserts, a signal line to initiate a lock, and lowers, or otherwise de-asserts, a signal line to indicate unlocking.

In some embodiments, each of the one or more function units responds to the assertion of a lock signal by issuing an "ACK" signal and an "ownership" indication if a portion of the transfer region is pertinent to the function unit. For example, each of the one or more function units communicates back to the DMA controller with two signal lines (e.g., an ACK line, and an "it's mine" line that is optionally asserted at a same time as the ACK line). In further embodiments, ACK signaling employs a shared signal coupled to a plurality of function units and ownership signals for each function unit comprise a separate signal line of a bus. In various embodiments, the DMA controller expects exactly one of the function units to "claim" the locked region and to respond (optionally within a timeout period) with an "it's mine" ACK, or the DMA controller indicates an error. For example, if no function unit claims the region, or if more than one of the function units claim the region, an error results. In some embodiments, the lock operations are performed by a sourcing DMA controller as data is read from a memory. In various embodiments, the lock operations are performed on a receiving DMA controller as data is written to a memory.

Locking only the lock region and only during the period when a DMA transfer of the lock region is in progress minimizes a need to stall updates performed by the one or more function units, in some embodiments and/or usage scenarios. An alternative of stopping update activity until a DMA is programmed and a transfer takes places is, in some embodiments and/or usage scenarios, less efficient when using DMAs operating multiple channels and/or where data transfer is activated by other entities, as the duration of stopping of updates becomes much larger and more unpredictable.

In some embodiments, DMA controller 900 is programmed with commands, each of the commands specifying respective source information and/or destination information, and/or length. In further embodiments, DMA controller 900 is operable to store and/or to process multiple commands at a same time. In still further embodiments, commands are stored in DMA controller 900 and later activated, enabling one processor to program DMA controller 900 to perform a data movement, and some other entity (system element, event, or external signal, for example) to activate the data movement.

In various embodiments, DMA controller 900 commands specify a scatter-gather list enabling a particular one of the commands to read from and/or write to a plurality of non-contiguous regions. For example, each element of the scatter-gather list for the particular command specifies a base address and a length. In further embodiments, at least one of the commands has an "immediate" mode where an address and/or a length refers to data to be operated on by the at least one of the commands, and a "scatter/gather" (non-immediate) mode where the address and/or the length refers to a scatter/gather list which in turn specifies an address and/or a length of one or more regions of data.

In some embodiments, the source information of a particular DMA command and the destination information of the particular DMA command both refer to locations in one or more memories, and the DMA operation of DMA controller 900 according to the particular DMA command moves data from a source one of the memories to a destination one of the memories.

In some embodiments, the source information and/or the destination information specify one or more of a memory destination and/or a non-memory destination. The non-memory destination comprises a particular I/O interface, or a particular data bus, for example. A data bus is a communication path on which the input and/or output of the DMA controller is received and/or sent. According to various embodiments, one DMA controller is configurable to receive from and/or drive to one or more I/O interfaces and/or data busses, and/or to read from and/or write to one or more memories. In some embodiments, each of one or more DMA channels of the DMA controller is coupled to a respective data bus and the DMA channels are configurable to operate substantively in parallel, such as by employing TDMA, or multi-path cross-point interconnection, for example. In further embodiments, at least two of the respective data busses are a single data bus that is shared in a time-multiplexed fashion, such as by including a DMA channel ID as a portion of the data sent on the single data bus. In various embodiments, each data bus is operable to be separately backpressured. When one of the respective data busses is backpressured, the DMA controller is configurable to continue transfers on others of the data busses. Backpressured comprises receiving or determining information regarding data transfer status (such as a buffer or FIFO being empty, near empty, near full or full, or some other condition, for example) and employing such information to regulate data transfer to or from the backpressured device, bus, or port.

In some embodiments, DMA controller 900 is operable to receive/append source information and/or destination information of a particular command from/to the data transfer of the command, such as in and/or with a header and/or a trailer, for example. For example, a source DMA controller has a table of 256 commands, each command associated with a source command index (from 0 to 255). Various embodiments of DMA controller 900 are configurable such that when a particular source DMA command is initiated (and a DMA channel referenced by that source DMA command is available), a data transfer of the source DMA command starts with a respective header containing destination information of the particular command, and continues with data read according to a source specification of the particular command. The header contains a receive command index of a receive DMA command of a receiving DMA controller. (In some embodiments, the indices are the same; in others, the source information of the particular command specifies the receive command index.)

In some embodiments, DMA controller 900 is configurable to receive a header, look up a corresponding receive DMA command via the receive command index, and process the receive DMA command to write the received data at a destination specified by destination information of the receive DMA command (A "receive" configured DMA controller also, in some embodiments, is operable to verify at least some of the destination information in the header vs. source information of the receive DMA command.) DMA controllers operating according to this example are termed "single-ended" DMAs, because the normal from/to function of the DMA controller is split into two pieces that are separately programmable and independently operable. For example, a sourcing DMA controller reads data from one or more memories and outputs data via one or more DMA channels to one or more respective data busses, and a receiving DMA controller coupled to one of the data busses receives the data (along with a header) and writes the data to one or more memories according to the header. As a sourcing (or source) DMA controller reads data, it is also referred to herein as a "read DMA". As a receiving (or receiver) DMA controller writes data, it is also referred to herein as a "write DMA". As previously discussed, DMA controllers are not limited in function and in various embodiments are configurable as a source DMA (a.k.a. a read DMA), a receiver DMA (a.k.a. a write DMA), or both (via multiple channels, for example.)

Single-ended DMAs enable intermediate function units to operate on data while it is "in flight" in a manner that is transparent to the DMA operation. For example, an encryption function unit coupled between the sourcing DMA controller and the receiving DMA controller is operable to encrypt the data, and the nature of operation of such intermediate processing is independent of the DMA controller operation at either end. In some embodiments, the header contains a length of the data being sent by each DMA command, and the intermediate function unit is operable to change the length of the data, such as by compressing the data with a lossless compression algorithm. (The header is updated to correspond to a new length of the data.) In another example, the intermediate function unit adds a CRC to protect the data, and a length of the transfer is increased by a length of the added CRC.

In some embodiments, single-ended DMA configurations employ a memory controller as an intermediate function unit. For example, a memory controller unit coupled between the sourcing DMA controller and the receiving DMA controller is operable to provide buffering using a plurality of buffering methodologies. In various embodiments, the buffering methodology consists of a region of a buffer memory that behaves as a FIFO between the sourcing DMA controller and the receiving DMA controller. In further embodiments, the FIFO has thresholds to backpressure the sourcing DMA controller, or signal the destination DMA controller that the data is ready. In still further embodiments, the buffering methodology employed by the memory controller enables the source and destination DMA controllers to use separate Scatter Gather lists. A portion of the data sent to the memory controller from the sourcing DMA controller, in one example, has a corresponding scatter gather entry indicating that data is to be discarded. The memory controller, upon receipt of an indication that the section is discarded, indicates to the receiving DMA controller to begin transfer of replacement data using a scatter gather list entry. This is useful when handling partially trimmed logical pages.

In some embodiments, the header information comprises datapath control information (DPCI) provided as part of the source DMA controller destination information that optionally and/or selectively controls processing of the intermediate function units. For example, the DPCI specifies functions such as: one of a plurality of encryption (or decryption) keys, whether a CRC is added or not, whether compression is performed or not, etc. Programming destination information of the source DMA controller provides routing (DMA channel) information, and control over intermediate processing.

In some embodiments, the DPCI and/or other information in the destination information in the header controls operations of the receiving DMA controller. For example, a destination data band is specified in the DPCI. In further embodiments, the intermediate function units are operable to modify the information that controls operation of the receiving DMA controller. Continuing the example, a compression unit determines that data is executable code and changes the destination data band of the data to a cold data band.

In some embodiments, a portion of the DPCI is sent in a separate stream of headers as part of the source DMA controller destination information. The separate stream of headers enables one single-end DMA to program another single-ended DMA with more information than is contained in the data path header sent from the source to the destination DMA. In some embodiments, the separate header stream comprises address and length information specifying where to transfer data in a Host's memory over a PCIe bus. The number of headers in the separate stream does not have to match the number of headers sent over the data path from the source to the destination DMA. In still further embodiments, the headers in the separate stream also comprise information needed to perform a CRC check on the data. For example, a Host reads 16 KB plus 32 bytes of CRC, 8 bytes of CRC per 4 KB. The sourcing DMA controller is programmed to generate 4 DMAs of 4 KB+8B each. In addition, the sourcing DMA is programmed with a separate stream of headers designating the separate 4 separate host memory addresses where to write the four 4 KB chunks of data, the host memory address where to write the CRC, and an Initialization Vector or Vectors to seed the destination DMAs CRC check unit. Prior to or in conjunction with the starting of the data transfer, the separate stream of headers is sent to the destination DMA, programming the destination DMA's operation. Providing a separate stream in this way, in some embodiments, enables both the source and destination DMAs to be programmed through a single DMA.

In some embodiments, one DMA command configures the DMA to generate and/or to receive a plurality of data frames on a data bus. For example, a source DMA controller command specifies a length of a unit of data and a number of units of data, each unit sent with a separate header as a frame. In some embodiments, the destination DMA controller command specifies a total expected length; in further embodiments, the destination DMA controller command specifies a number of expected frames. In various embodiments, each frame comprises one unit, such as one sector or one page, of data. (Though in some embodiments, frames generated and/or received according to one command are not all of a same size.) Separating a data transfer into multiple frames enables an intermediate function unit to operate on each unit of the data transfer independently. The processing overhead of programming the DMA controller(s) with a DMA command are optionally amortized over multiple units of data, and the DMA command is enabled to correspond to a size of a Host data transfer (e.g., possibly many sectors). For example, a Host writes 16 KB. The sourcing DMA controller is programmed to generate four data frames of 4 KB each. An intermediate function unit (such as a function unit, for example) is configured to compress each of the frames, enabling a size of some of the frames to be reduced. A receiving DMA controller is programmed to receive four frames (of some size). The processing overhead treats the operation as a 16 KB operation on write, but the datapath logic (data busses and compression unit) treats the operation as four, 4 KB operations. Treating the data in units of a smaller size enables, in some embodiments, later access of the data in units of the smaller size. For example, the Host later reads one of the 4 KB units.

In some systems employing decoupled locking DMA architecture embodiments, a hardware unit and/or a processor update a data structure, such as per-block information on NVM read disturb counts and/or error rates or a first-level map table, for example, periodically (not limited to a fixed period, but over time in a somewhat regular fashion, such as in response to NVM reads according to Host read commands). The data structure comprises a plurality of entries, perhaps tens or hundreds of thousands in various embodiments. The entries are optionally and/or selectively bit-packed to save space. For example, if each of the entries is 9 bits in width, whereas a memory storing the entries is 64 bits in width (has 64-bit words), at least some of the entries straddle memory word boundaries so as to more efficiently use storage space. For entries that span two of the memory words, there is a possibility of inconsistency if the particular entry is in the middle of being updated while the data structure is being read—the read of the data structure might see the new value of one portion of the particular entry and the old value of the other portion of the particular entry. Various embodiments employ data locking, atomic updates, or other approaches to maintain data integrity.

In various embodiments, a plurality of different types of data structures are updated and are otherwise maintained at one time. In various embodiments, a size of a particular one of the data structures is such that it is advantageous to copy the particular data structure to NVM, such as for checkpointing, via a plurality of separate DMA transfers responsive to a plurality of DMA commands, each command operating on a portion of the particular data structure. Various embodiments are configurable such that at times during system operation, optionally and/or selectively according to other system events, one or more of the data structures are checkpointed, such as by being written to NVM. The reading of the data structures to transfer the data structures to NVM is, at least in part, via a DMA controller. Data structures (or a given portion of one of the data structures) must not be updated while a DMA transfer of that data structure (or the given portion) is in progress, or inconsistencies may result. As noted previously, various embodiments employ data locking, atomic updates, or other approaches to maintain data integrity.

One or more function units are coupled to a lock signal. In some decoupled DMA architecture embodiments, a function unit is operable to receive a lock signal and, responsive to the lock signal, selectively inhibit access to one or more system elements or to a range of locations, and in various embodiments, assert an ACK signal. Various decoupled DMA architectures comprise function units wherein some function units provide ACK signals and other function units do not provide ACK signals. In some embodiments, a plurality of lock signals are provided wherein some lock signals suspend DMA channel operation pending an ACK signal, and other lock signals do not.

Figure 5:
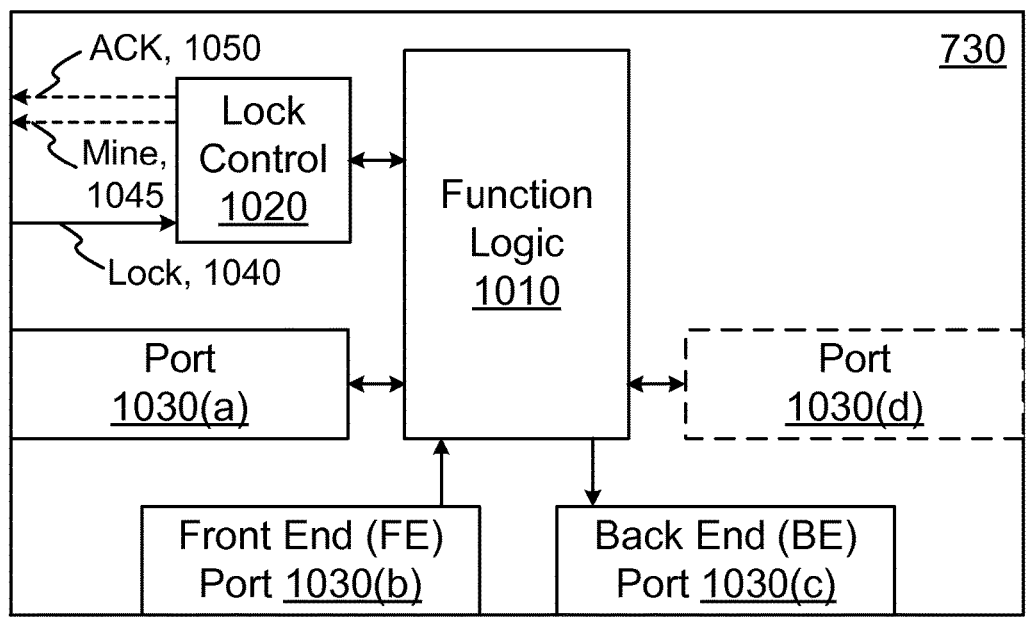
FIG. 5 illustrates selected details of an embodiment of a function unit.

FIG. 5 illustrates selected details of an embodiment of a function unit 730, such as in FIG. 2, or such as any of function units 730-1, . . . 730-(n−1), and 730-(n) of FIGS. 3A and 3B. Function unit 730 comprises function logic 1010, lock control 1020, and a plurality of ports 1030(a), 1030(b), 1030(c), and 1040(d). According to embodiment, function unit 730 further comprises a) lock input 1040, b) both lock input 1040 and ACK output 1050, or c) lock input 1040, Mine output 1045, and ACK output 1050. In FIG. 3A, the Lock, Mine, and ACK signals (each where present according to embodiment) are coupled to the Locking 736 sub-bus of Bus 740. Multiple functions units share a common Lock 736-L signal, but each function unit (730-1 through 730-n) has respective Mine 736-M and ACK 736-A signals (each where present, according to embodiment). For example, dedicated Mine 736-M<1> and Ack 736-A<1> signals correspond to function unit 730-1, while dedicated Mine 736-M<n> and Ack 736-A<n> signals correspond to function unit 730-n. In the embodiments of FIGS. 2, 3A, and 3B, lock input 1040 and ACK output 1050 (when present), are coupled to other system elements via Locking bus 736, so as to enabled fine-grained low-latency arbitrated access to a shared resource, such as Buffer 755, and as described elsewhere herein. Function logic 1010 is operable to receive data from front end (FE) port 1030(b) and output data on back end (BE) port 1030(c), such as conveyed respectively via bus 735 and 740 of FIG. 2, or bus 737 and bus 738 of FIGS. 3A and 3B. In some embodiments, function logic 1010 is operable to write data to another circuit element via port 1030(a). For example, when processing data received from port 1030(b), the function unit writes checkpoint information to a buffer or other storage element coupled to port 1030(a), such as to Buffer 755 via Bus 740, in FIGS. 3A and 3B. In various embodiments, when lock input 1040 is asserted, function logic 1010 suspends write operations. In further embodiments, when lock input 1040 is asserted, the function logic completes writing one or more data elements and asserts lock acknowledge (ACK) output 1050. In some embodiments, when lock signal 1040 is asserted, function logic 1010 suspends read and write operations. Port 1030(d) finds application in some embodiments with more than one type of data, such as described in conjunction with bus 745 of FIG. 2. Port 1030(d) also finds further application in embodiments where the function units may have lock-arbitrated access to Buffer 765 via Bus 741 (a simplified representation of the same type of bus as Bus 740), as suggested in FIG. 3A.

Figure 6:
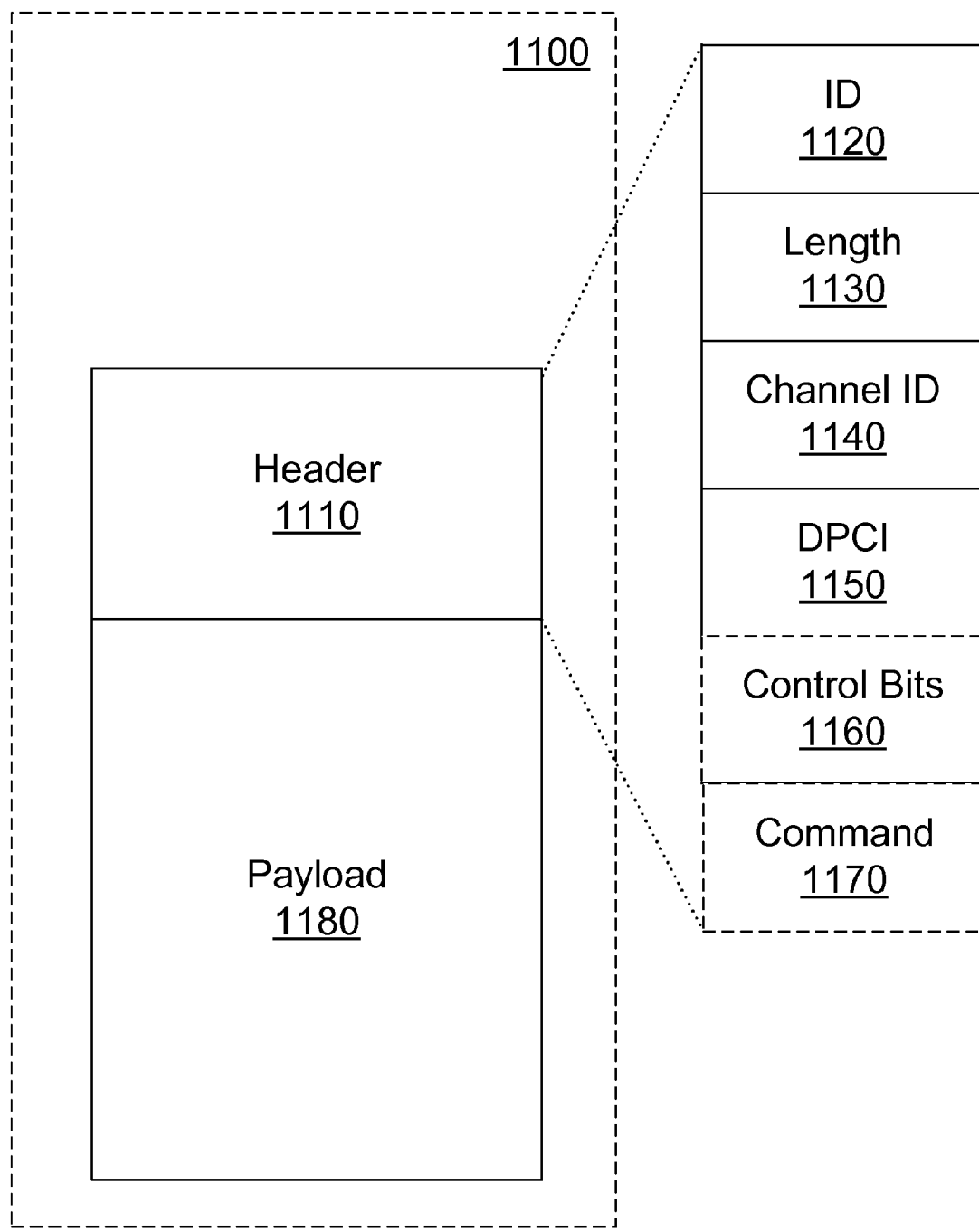
FIG. 6 illustrates selected details of an embodiment of a frame format.

In some embodiments, a frame format is employed for data transfer. FIG. 6 illustrates selected details of an embodiment of a frame format. Frame format 1100 comprises a header 1110 and a payload 1180. In some embodiments, header 1110 comprises sub-portions ID 1120, Length 1130, Channel ID 1140, and datapath control information (DPCI) 1150. Various embodiments comprise control bits 1160 employed to signal start of data, end, of data, or to provide some other information. Further embodiments comprise command 1170 wherein the command is conveyable to a DMA target device or function unit. In some embodiments, the command comprises an index into a command store. For example, referring to any of FIG. 2, 3A, or 3B, DMA-1 710 is operable to convey a packet comprising command information to DMA-2 720 wherein DMA-2 720 is operable to select a command (from an indexed command store, for example) based on the command information. In various embodiments, command information is conveyed via auxiliary bus signals.

Embodiments of the decoupled DMA architecture are not limited to any particular data transfer formats or sub-portions contained therein. In some embodiments of the DMA decoupled architecture, a bus coupling a first DMA and at least a second DMA comprises data lines and auxiliary signal lines. In some various embodiments, auxiliary signal lines convey a portion of the information corresponding to at least one of ID 1120, Length 1130, Channel ID 1140, (DPCI) 1150, and control bits 1160. Restated, some decoupled DMA architecture embodiments employ frame based formats where control information is contained within at least some packets and various embodiments employ bus auxiliary signal lines to convey control information and further embodiments employ a combination of frame packets and auxiliary signals to convey control information.

In some embodiments and/or usage scenarios, decoupled DMA architecture embodiments enable partitioning of data processing software. For example, a first DMA is configured to process host-side data wherein processing comprises accessing data employing scatter-gather lists and formatting of data into frames compatible with storage-side processing where a second DMA performs other operations such as post ECC formatting data, write coalescing, or other functions. In some embodiments and/or usage scenarios, decoupled DMA architecture embodiments include dynamic scheduling of data processing reflective of operating conditions of both a host-side DMA and a storage-side DMA.

Figure 7A:
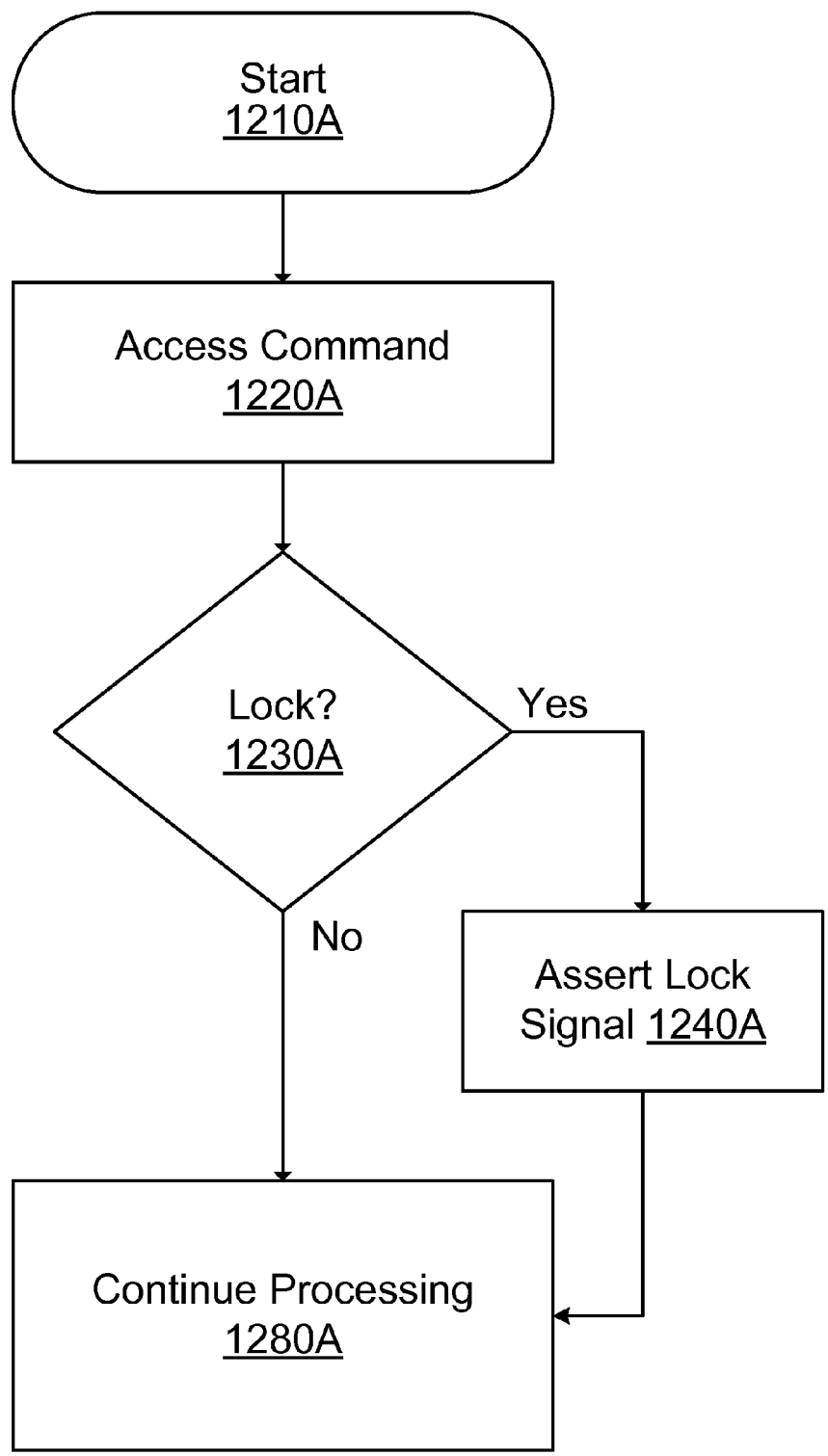
FIG. 7A illustrates, via a flow chart, selected details of an exemplary embodiment of a procedure for locking a function unit.

FIG. 7A illustrates, via a flow chart, selected details of an exemplary embodiment of a procedure for locking a function unit. When DMA controller 710 advances to a new location containing a command, flow begins (Start, 1210A). A command is accessed (Access Command 1220A) and a check is performed (Lock? 1230A) to determine if the command is one that enables a lock signal. In some embodiments, the check comprises determining the value of one or more bits in a command. In various embodiments, the check comprises comparing the value of an address associated with, or derived from, a command with a reference value. If the command enables a lock signal, a lock signal is asserted (Assert Lock Signal 1240A) and flow proceeds to (Continue Processing 1280A). If the command does not enable a lock signal, flow proceeds to (Continue Processing 1280A).

Figure 7B:
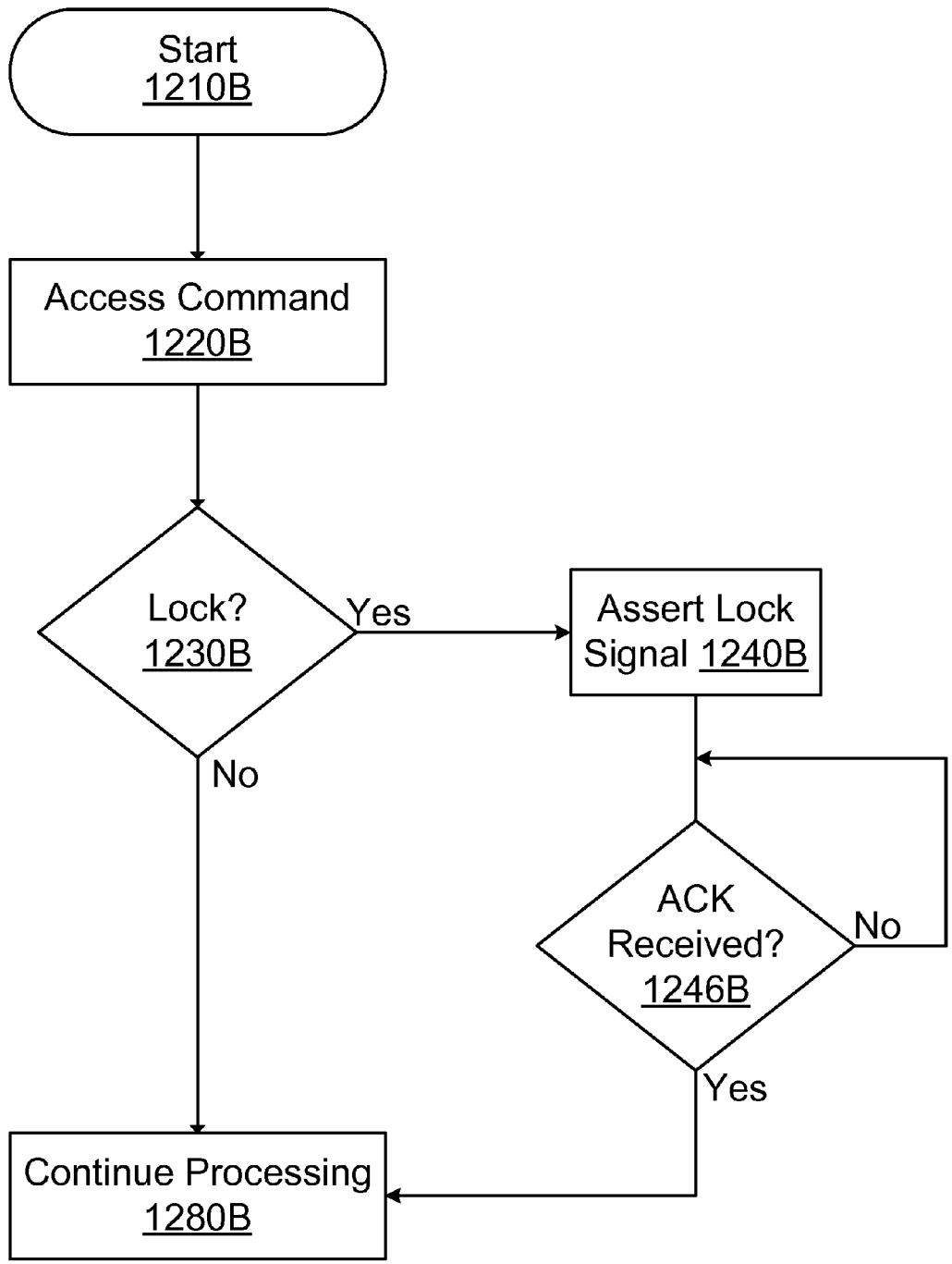
FIG. 7B illustrates, via a flow chart, selected details of an exemplary embodiment of another procedure for locking a function unit.

FIG. 7B illustrates, via a flow chart, selected details of an exemplary embodiment of another procedure for locking a function unit. In this procedure a DMA controller asserts a locking signal and waits for an acknowledgement signal prior to continuing processing. When DMA controller 710 advances to a new location containing a command, flow begins (Start, 1210B). A command is accessed (Access Command 1220B) and a check is performed (Lock? 1230B) to determine if the command is one that enables a lock signal. In some embodiments, the check comprises determining the value of one or more bits in a command. In various embodiments, the check comprises comparing the value of an address associated with, or derived from, a command with a reference value. If the command does not enable a lock signal, flow proceeds to (Continue Processing 1280B). If the command enables a lock signal, a lock signal is asserted (Assert Lock Signal 1240B) and a check is performed (ACK Received? 1246B) if an acknowledgement signal is received. If no acknowledgment signal is received flow continues at (ACK Received? 1246B). If an acknowledgement signal is received, flow proceeds to (Continue Processing 1280B).

Figure 7C:
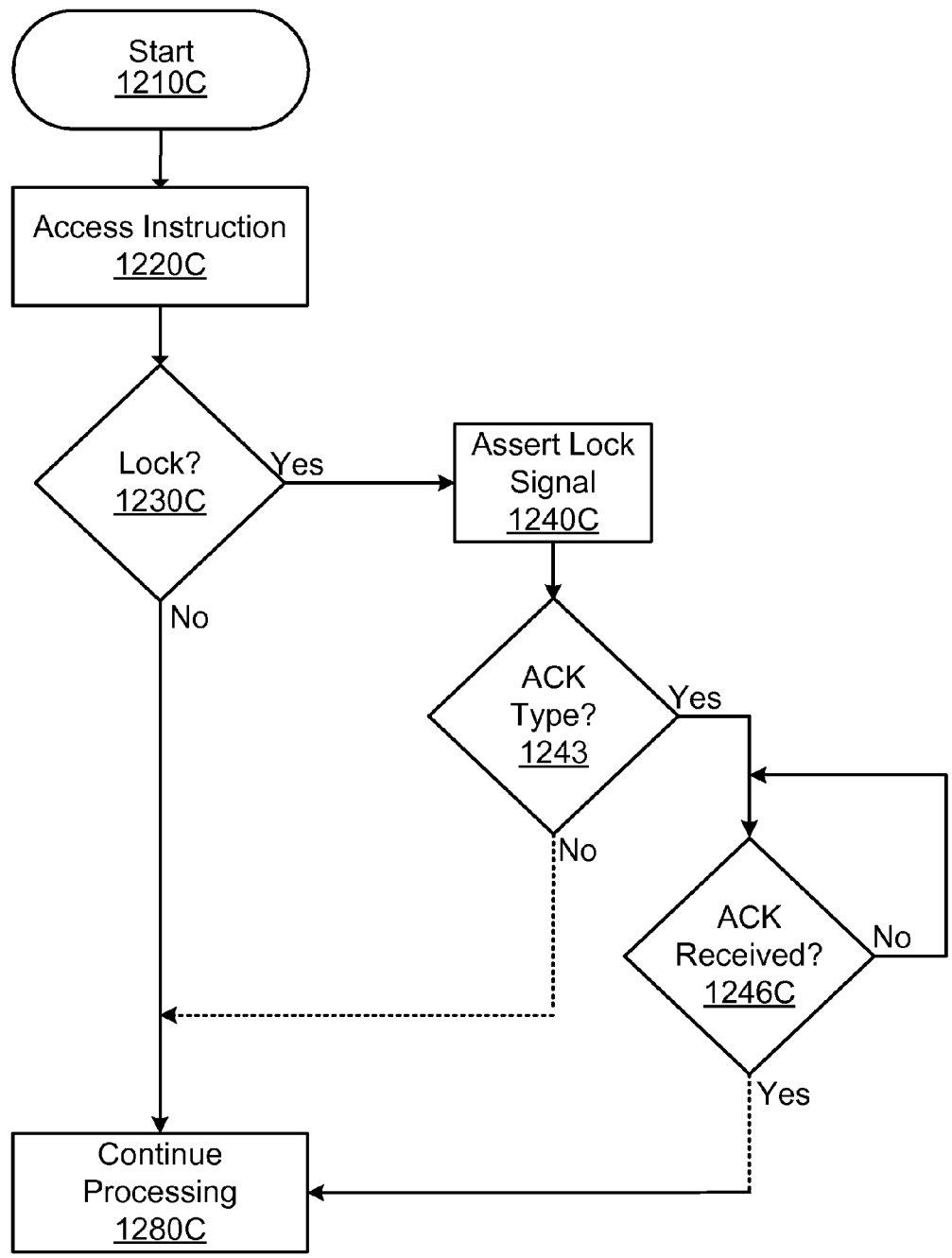
FIG. 7C illustrates, via a flow chart, selected details of an exemplary embodiment of a further procedure for locking a function unit.

FIG. 7C illustrates, via a flow chart, selected details of an exemplary embodiment of a further procedure for locking a function unit. In this procedure a DMA controller is operable, responsive to a type of command being processed, to issue a lock signal and continue processing, or to issue a lock signal and wait for an acknowledgement signal prior to continuing processing. When DMA controller 710 advances to a new location containing a command, flow begins (Start, 1210C). A command is accessed (Access Command 1220C) and a check is performed (Lock? 1230C) to determine if the command is one that enables a lock signal. In some embodiments, the check comprises determining the value of one or more bits in a command. In various embodiments, the check comprises comparing the value of an address associated with, or derived from, a command with a reference value. If the command does not enable a lock signal, flow proceeds to (Continue Processing 1280C). If the command enables a lock signal, a lock signal is asserted (Assert Lock Signal 1240C) and a check is performed if this is a lock that employs an acknowledgement signal (ACK Type? 1243). If the lock does not employ an acknowledgement signal, flow proceeds to (Continue Processing 1280C). If the lock employs an acknowledgement signal, a check is performed (ACK Received? 1246C) if an acknowledgement signal is received. If no acknowledgment signal is received, flow continues at (ACK Received? 1246C). If an acknowledgement signal is received, flow proceeds to (Continue Processing 1280C).

Further embodiments of procedures illustrated in FIGS. 7B and 7C comprise task switching while waiting for an ACK signal to be received and error generation if an ACK signal is not received within a reference period of time, or if too many ACK responses are received.

Figure 8:
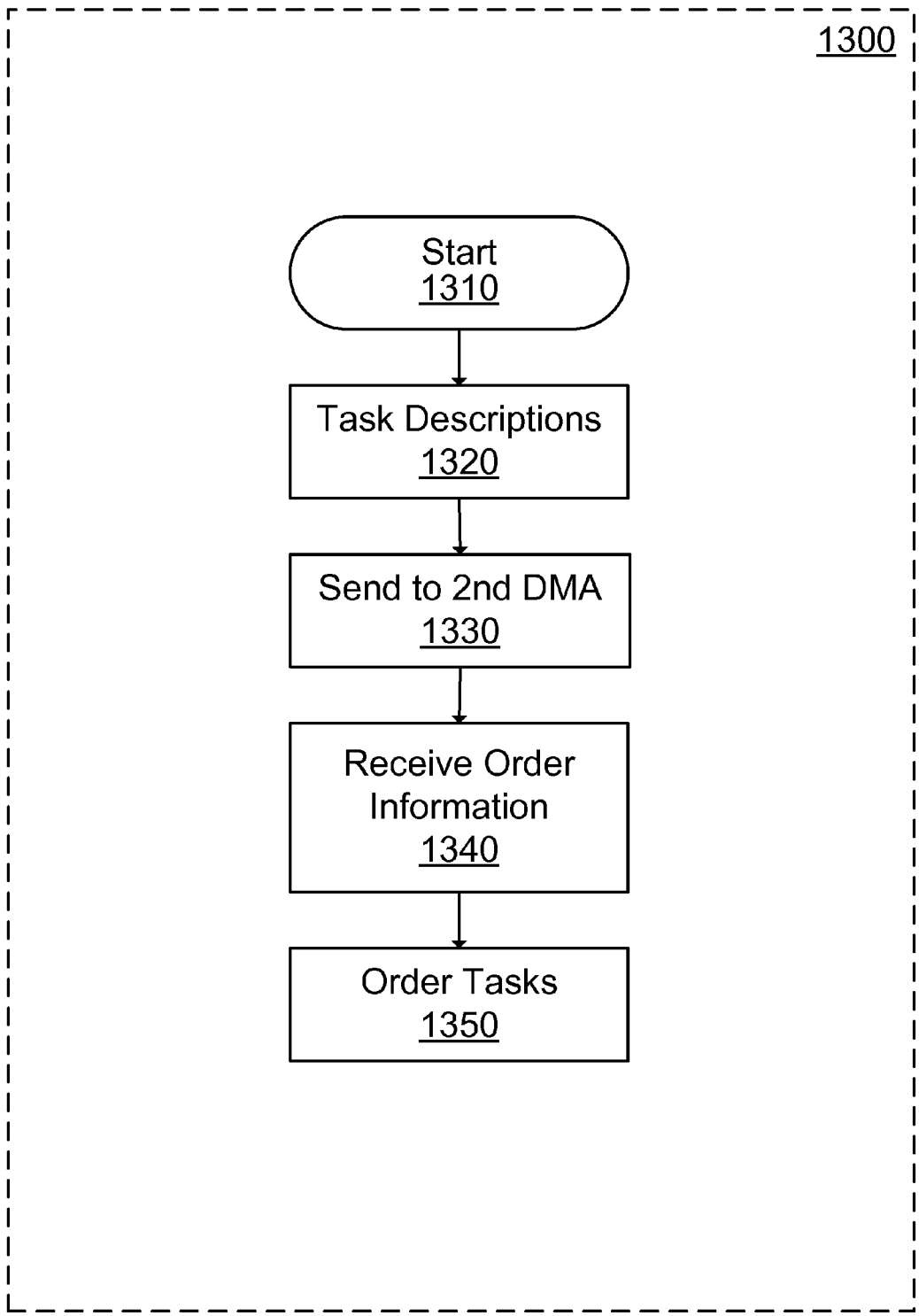
FIG. 8 illustrates, via a flow chart, selected details of an exemplary embodiment of a procedure for task ordering.

FIG. 8 illustrates, via a flow chart, selected details of an exemplary embodiment of procedure 1300 for task ordering. In this procedure a first DMA controller communicates pending task information to a second DMA controller and receives order information from the second DMA controller indicating an order in which tasks are to be performed. When new tasks are added to a set of tasks to be performed by the first DMA controller, or in response to some other condition, flow begins (Start 1310). Information regarding pending tasks (Tasks Descriptions 1320) are generated and conveyed (Send to $2^{nd}$ DMA 1330) to a second DMA controller. Information indicating an order of execution is received (Receive Order Information 1340) from the $2^{nd}$ DMA controller and an order of processing (Order Tasks 1350) is determined.

In some embodiments of task ordering, the order information also comprises transfer rate information for at least one of the tasks. The procedure embodiment illustrated in FIG. 13 is applicable to both "push" and "pull" data transfers. For example, in a push data transfer, a first DMA sending various data sets to a second DMA receives pending task information from the second DMA and conveys a desired ordering of pending tasks for the second DMA. In a pull data transfer, the first DMA sending various data sets sends task information to the second DMA and receives ordering information from the second DMA, for example. In some embodiments and/or usage scenarios, task ordering embodiments enable accommodation of variable data rates, as occurs if data is transferred to or from a network, for example, and enables improved buffer management wherein a DMA controller prioritizes completion of a data set to free up buffer space, for example. In various embodiments of a decoupled DMA architecture, information comprising an ordering of tasks is conveyed as a portion of a packet or other data bus transfer and in further embodiments is conveyed through bus auxiliary signals. In some embodiments, task ordering comprises commands issued as part of a packet or conveyed via bus auxiliary signals.

Example Implementation Techniques

In some embodiments, various combinations of all or portions of operations performed by a system implementing a decoupled locking Direct Memory Access (DMA) architecture, a computing-host flash memory controller, and/or an SSD controller (such as SSD Controller 100 of FIG. 1A), and portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is designable and/or manufacturable according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacturing of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments some, all, or various portions of the program instructions are realized as one or more functions, routines, sub-routines, in-line routines, procedures, macros, or portions thereof.

CONCLUSION

Certain choices have been made in the description merely for convenience in preparing the text and drawings and unless there is an indication to the contrary the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

The words "includes" or "including" are specifically intended to be construed as abstractions describing logical sets of open-ended scope and are not meant to convey physical containment unless explicitly followed by the word "within."

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as flash memory technology types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (i.e., generally dedicated circuitry) or software (i.e., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments. It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising:
    a solid state drive (SSD) controller configured to manage flash memory, the SSD controller including:
       a read direct memory access (DMA) controller coupled between a first buffer memory and a function unit, the first buffer memory configured to receive data from a host device;
       a write DMA controller coupled between the function unit and a second buffer memory, the second buffer memory configured to provide data to the flash memory;
       the read DMA controller configured to send to the function unit a header based on a read DMA command followed by data read from the first buffer memory based on the read DMA command, the data read from the first buffer memory being data received from the host device for storage to the flash memory, the header comprising function unit control information that controls the operation of the function unit and a length field specifying a length of the data read from the first buffer memory and sent to the function unit;
       the function unit configured to process the header to determine a cryptographic key indicated by the function unit control information of a plurality of cryptographic keys and to perform a cryptographic transform of the data read from the first buffer memory using the cryptographic key indicated by the function unit control information, the cryptographic transform further compressing the data read from the first buffer memory for storage to the flash memory; and
       the write DMA controller configured to write the transformed data from the function unit into the second buffer memory.

2. The system of claim 1, wherein the transformed data from the function unit has a different length than the data read from the first buffer memory.

3. The system of claim 2, wherein the function unit is further operable to send a modified header to the write DMA controller, the modified header having the length field specifying a length of the transformed data.

4. The system of claim 3, wherein the write DMA controller is configured to write an amount of data into the second buffer memory corresponding to the length specified by the length field of the modified header.

5. The system of claim 1, wherein the write DMA controller writes the transformed data in accordance with a write DMA command associated with an operation tag.

6. The system of claim 5, wherein the operation tag associated with the write DMA command is also associated with the read DMA command.

7. The system of claim 5, wherein the operation tag associated with the write DMA command is different than an operation tag associated with the read DMA command.

8. The system of claim 6, wherein the read DMA controller and the write DMA controller are configured to be programmed with the read DMA command and the write DMA command at different times and by different software agents.

9. The system of claim 8, wherein the read of the data read from the first buffer memory, the transformation of the data transformed by the function unit, and write of the data written to the second buffer memory, are decoupled sub-operations of a same DMA operation.

10. The system of claim 9, wherein the data read from the first buffer memory, the data transformed by the function unit, and data written to the second buffer memory, selectively according to the data read exceeding a data frame size, are each decomposed into a plurality of data frames that share a same operation tag and are different portions of the same DMA operation.

11. The system of claim 10, wherein the plurality of data frames sharing the same operation tag are enabled to be processed out-of-order.

12. A method comprising:
reading data from a first buffer memory by a read DMA controller of a solid state drive (SSD) controller configured to manage flash memory based on with a read DMA command, the first buffer memory configured to receive data from a host device;
sending to a function unit of the SSD controller, based on the read DMA command, a header followed by the data, the header comprising function unit control information that controls the operation of the function unit;
processing, by the function unit, the header to determine a cryptographic key indicated by the function unit control information of a plurality of cryptographic keys;
cryptographically transforming the data, by the function unit, using the cryptographic key indicated by the function unit control information comprised in the header, the cryptographic transforming further compressing the data read from the first buffer memory for storage to the flash memory; and
writing the transformed data from the function unit into a second buffer memory by a write DMA controller based on a write DMA command, the second buffer memory configured to provide data to the flash memory.

13. The method of claim 12, further comprising:
programming the read DMA command independently of programming the write DMA command.

14. The method of claim 12, further comprising:
associating the read DMA command with a source operation tag;
associating the write DMA command with a receive operation tag; and
wherein the source operation tag and the receive operation tag are different.

15. The method of claim 12, wherein the read DMA command is associated with a source operation tag, the write DMA command is associated with a receive operation tag, and
the source operation tag and the receive operation tag are identical.

16. The method of claim 12, further comprising:
respectively performing the reading, sending, transforming, and writing in data frame sized units as different portions of a same DMA operation.

17. The method of claim 16, further comprising:
processing out-of-order data frame sized units of the same DMA operation.

18. The method of claim 16, wherein data frame sized units of the same DMA operation all share the same operation tag.

19. The method of claim 12, wherein the transformed data from the function unit has a different length than the data read from the first buffer memory.

20. An apparatus comprising:
a solid state drive (SSD) controller configured to manage flash memory, the SSD controller including:
a read direct memory access (DMA) controller of the SSD controller coupled between a first buffer memory and a function unit, the first buffer memory configured to receive data from a host device;
a write DMA controller of the SSD controller coupled between the function unit and a second buffer memory, the second buffer memory configured to provide data to the flash memory;
the read DMA controller configured to send to the function unit a header based on a read DMA command followed by data read from the first buffer memory based on the read DMA command, the header comprising function unit control information that controls the operation of the function unit and a length field specifying a length of the data read from the first buffer memory and sent to the function unit;
the function unit configured to perform a cryptographic transform of the data read from the first buffer memory using a cryptographic key indicated by the function unit control information of a plurality of cryptographic keys, the cryptographic transform further compressing the data read from the first buffer memory for storage to the flash memory; and
the write DMA controller configured to write the transformed data from the function unit into the second buffer memory.

* * * * *